(12) United States Patent
Sugimura

(10) Patent No.: US 11,731,559 B2
(45) Date of Patent: Aug. 22, 2023

(54) MOUNTING STRUCTURE AND MOUNTING BASE FOR ROTARY MOUNTING-TYPE WINDSHIELD MOUNTED IN-VEHICLE DEVICE

(71) Applicant: MURAKAMI CORPORATION, Shizuoka (JP)

(72) Inventor: Naomi Sugimura, Shimada (JP)

(73) Assignee: MURAKAMI CORPORATION, Shizuoka (JP)

( * ) Notice: Subject to any disclaimer, the term of this patent is extended or adjusted under 35 U.S.C. 154(b) by 471 days.

(21) Appl. No.: 16/965,160

(22) PCT Filed: Jan. 29, 2019

(86) PCT No.: PCT/JP2019/002944
§ 371 (c)(1),
(2) Date: Jul. 27, 2020

(87) PCT Pub. No.: WO2019/151233
PCT Pub. Date: Aug. 8, 2019

(65) Prior Publication Data
US 2020/0361379 A1    Nov. 19, 2020

(30) Foreign Application Priority Data

Jan. 31, 2018  (JP) ................. 2018-014699

(51) Int. Cl.
*B60R 1/04* (2006.01)
*F16C 11/06* (2006.01)
*B60R 1/12* (2006.01)

(52) U.S. Cl.
CPC ............ *B60R 1/04* (2013.01); *F16C 11/0695* (2013.01); *B60R 1/12* (2013.01); *B60R 2001/1223* (2013.01)

(58) Field of Classification Search
CPC ......... B60R 1/04; B60R 1/12; B60R 11/0235; B60R 2001/1215; B60R 2011/0026; B60R 2001/1223; F16C 11/0695
(Continued)

(56) References Cited

U.S. PATENT DOCUMENTS 4,995,581 A * 2/1991 Koiwai .................... B60R 1/04
                                                                248/549
5,820,097 A * 10/1998 Spooner .................. B60R 1/04
                                                                248/549

(Continued)

FOREIGN PATENT DOCUMENTS

CN        105377631        3/2016
CN        105383389        3/2016
(Continued)

OTHER PUBLICATIONS

India Official Action issued in India Application No. 202017030564, dated Dec. 29, 2020.
(Continued)

*Primary Examiner* — Christopher Garft
*Assistant Examiner* — Michael McDuffie
(74) *Attorney, Agent, or Firm* — Greenblum & Bernstein, P.L.C.

(57) ABSTRACT

A mounting base is mounted to a windshield surface. A support stay is mounted to the mounting base via a support stay mounting leaf spring by being rotated in a direction around a rotation axis. A support stay mounting surface of the mounting base and a mounted surface of the support stay include abutment support structures. The abutment support structures bring the support stay mounting surface and the mounted surface into abutment with each other via a plurality of abutment support portions surrounding the rotation axis to make the support stay be supported on the mounting (Continued)

base. The abutment support portions include a first abutment support portion disposed in an angle direction toward a lower side of a circumference around the rotation axis with the rotation axis as a center.

11 Claims, 18 Drawing Sheets

(58) Field of Classification Search
USPC .... 248/549, 208, 548, 466, 475.1, 476, 479, 248/481, 494, 495, 220.22, 221.11, 248/222.11, 222.12, 222.13
See application file for complete search history.

(56) References Cited

U.S. PATENT DOCUMENTS

| | | | |
|---|---|---|---|
| 6,899,370 B2 | 5/2005 | Kalchschmidt et al. | |
| 7,726,623 B2 | 6/2010 | Muller et al. | |
| 8,210,695 B2 * | 7/2012 | Roth | B60R 1/12 359/872 |
| 8,622,356 B2 * | 1/2014 | Lerchner | H01Q 1/1214 248/231.21 |
| 8,925,891 B2 * | 1/2015 | Van Huis | B60R 1/04 248/548 |
| 9,244,249 B2 | 1/2016 | Kim et al. | |
| 10,300,858 B2 * | 5/2019 | Roth | B60R 1/04 |
| 10,434,946 B2 * | 10/2019 | Busscher | B60R 1/04 |
| 11,040,663 B2 * | 6/2021 | DeMaagd | B60R 1/04 |
| 11,254,264 B2 * | 2/2022 | Sugimura | B60R 1/04 |
| 11,285,876 B2 * | 3/2022 | Sugimura | B60R 1/12 |
| 2005/0085100 A1 * | 4/2005 | Wada | B60R 1/04 439/34 |
| 2014/0055617 A1 | 2/2014 | Minikey, Jr. et al. | |
| 2014/0175250 A1 * | 6/2014 | Chieppa | B60R 1/04 248/475.1 |
| 2018/0172065 A1 * | 6/2018 | Stewart | F16C 11/0623 |
| 2021/0237650 A1 * | 8/2021 | Hoogenboom | B60R 1/12 |

FOREIGN PATENT DOCUMENTS

| | | |
|---|---|---|
| JP | 63-201848 U | 12/1988 |
| JP | 2003-146135 A | 5/2003 |
| JP | 2003-291727 A | 10/2003 |
| JP | 3197994 | 6/2015 |
| JP | 2016-150723 | 8/2016 |
| JP | 2016-155435 A | 9/2016 |

OTHER PUBLICATIONS

Decision to Grant a Patent issued in Japanese Patent Application No. 2019-569119 dated Aug. 9, 2022.
U.S. Appl. No. 29/657,909, to Naomi Sugimura, filed Jul. 26, 2018.
U.S. Appl. No. 29/657,901, to Naomi Sugimura, filed Jul. 26, 2018.
Written Opinion issued in Patent Application No. PCT/JP2019/002944, dated Mar. 12, 2019, along with an English translation thereof.
International Search Report issued in Patent Application No. PCT/JP2019/002944, dated Mar. 12, 2019, along with an English translation thereof.
China Office Action and Search Report received in CN Application No. 201980011381.4, dated Jan. 5, 2023.

* cited by examiner

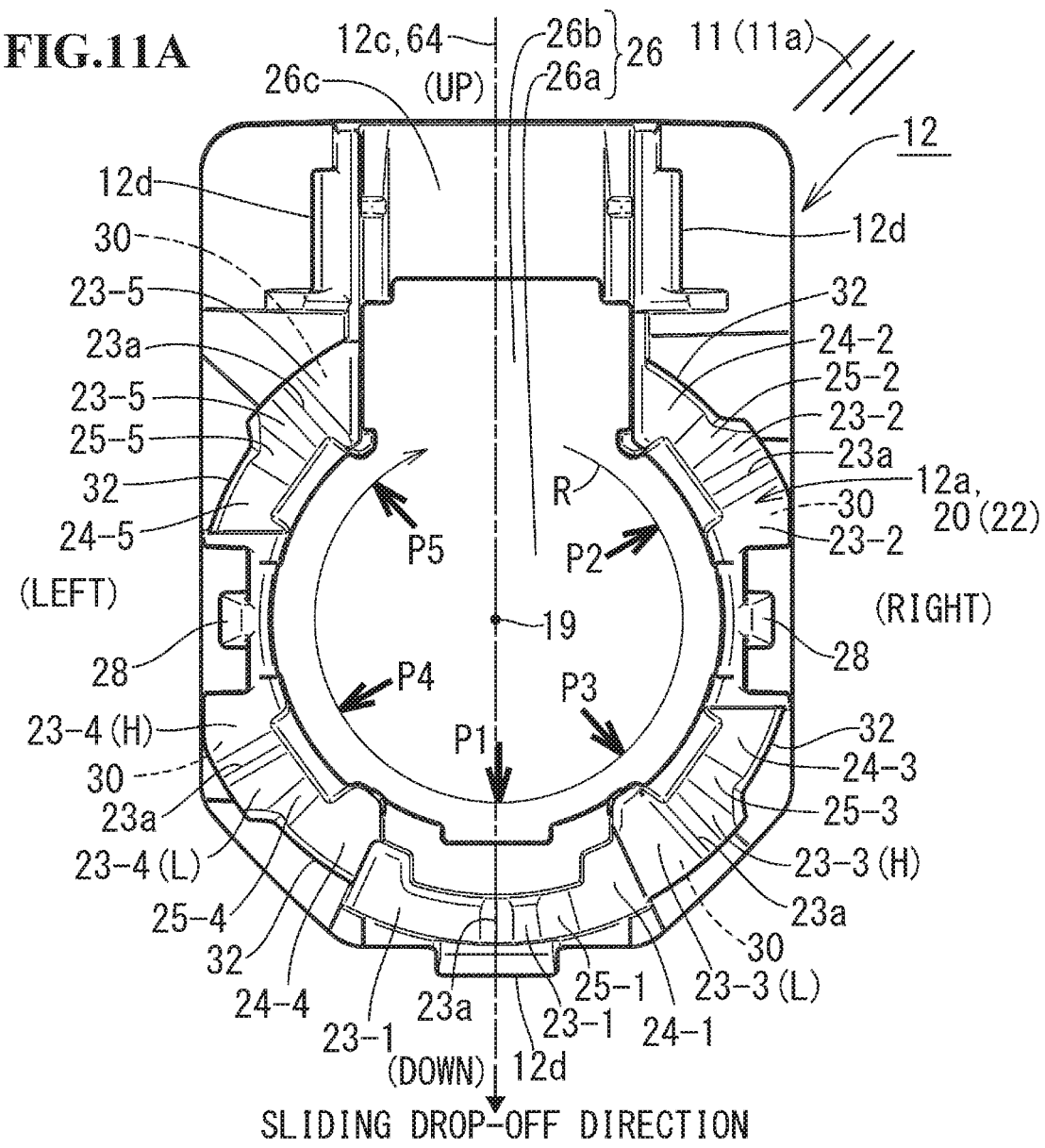
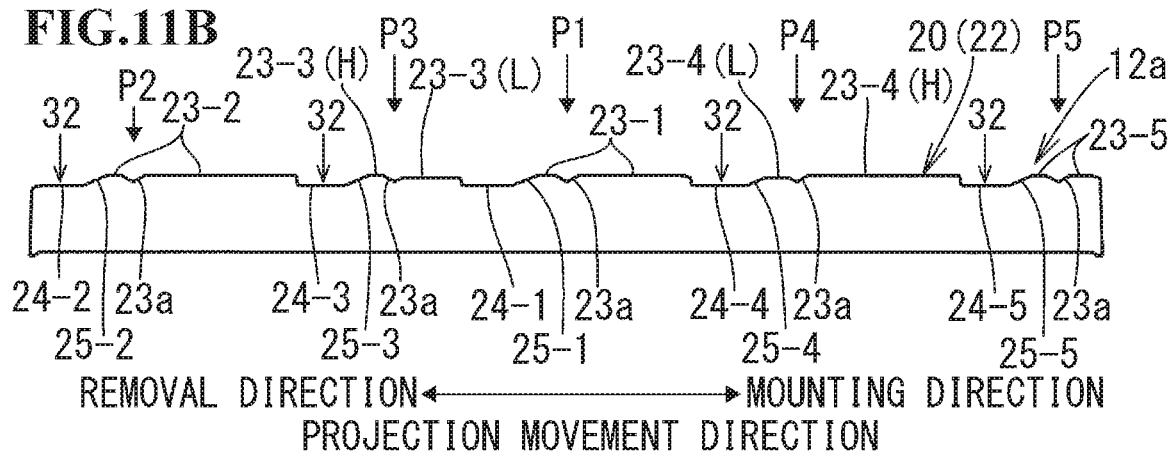

(P1)

(P2)

MOUNTING STRUCTURE AND MOUNTING BASE FOR ROTARY MOUNTING-TYPE WINDSHIELD MOUNTED IN-VEHICLE DEVICE

The disclosure of Japanese Patent Application No. JP2018-014699 filed on Jan. 31, 2018 including the specification, drawings, claims and abstract is incorporated herein by reference in its entirety.

TECHNICAL FIELD

This invention relates to a mounting structure for mounting an in-vehicle device to a mounting base (which may commonly be called "button") fixed to a windshield surface of a cabin of a vehicle in such a manner that the in-vehicle device can drop off and a mounting base that is usable for the mounting structure. This invention specifically relates to a rotary-type mounting structure that enables providing favorable support performance for an in-vehicle device while curbing degradation in drop-off performance (which leads to difficulty in dropping off).

BACKGROUND ART

As one of in-vehicle devices to be mounted to a windshield surface of a cabin of a vehicle in such a manner that the in-vehicle device can drop off, there is a windshield mounted inner mirror. The windshield mounted inner mirror has a structure in which a mirror body (in-vehicle device) is mounted to a mounting base mounted to a surface on the interior side of a windshield (front window) by means of, e.g., bonding, via a support stay. The mounting structure is configured in such a manner that when a large external force is applied to the mirror body by, e.g., the head of an occupant colliding with the mirror body, the support stay drops off from the mounting base together with the mirror body to protect the occupant from injury. As types of mounting structures for mounting a support stay to a mounting base in such a manner that the support stay can drop off, there are a rotation-type and a sliding-type. Patent Literature 1 describes a rotary-type mounting structure with three-point support. Patent Literature 2 describes a rotary-type mounting structure with four-point support. Patent Literature 3 describes a sliding-type mounting structure.

CITATION LIST

Patent Literature

Patent Literature 1: U.S. Pat. No. 7,726,623
Patent Literature 2: U.S. Patent Application Publication No. 2014/0055617
Patent Literature 3: U.S. Pat. No. 9,244,249

SUMMARY OF INVENTION

Technical Problem

A sliding-type mounting structure has a structure in which a support stay is mounted to the mounting base by being slid from the upper side to the lower side, and thus, in order to employ this mounting structure, space for mounting is needed in an upper portion of the cabin. On the other hand, such problem is less likely to occur in a rotary-type mounting structure. In a rotary-type mounting structure, a support stay abuts against and is supported on a mounting base via a plurality of abutment support portions provided by an abutment support structure disposed around a rotation axis orthogonal to a support stay mounting surface (that is, a surface supporting a mounted surface of the support stay) of the mounting base (that is, a rotation axis for rotary mounting action). The support stay is joined to the mounting base via a leaf spring, and a biasing force of the leaf spring brings each abutment support portion into a pressure-abutment state and the support stay is thereby mounted and supported on the mounting base. If a large external force is applied to a mirror body, the joining between the support stay and the mounting base is undone against the biasing force of the leaf spring and the support stay drops off from the mounting base together with the mirror body.

In recent years, electronic mirrors are spreading. The electronic mirrors are intended to display an image around the rear side of a vehicle on a display. The electronic mirrors are substantially larger in weight than conventional non-electronic mirrors (reflective mirrors), and thus, the problem of vibration of a mirror body due to insufficiency in strength of a mounting structure is becoming prominent. In a rotary-type mounting structure, an effect of curbing vibration of a mirror body can be expected by increasing the number of abutment support portions to enhance support strength. However, an unnecessary increase in number of abutment support portions may interfere with a drop-off action.

This invention has been made in view of the aforementioned points and provides a rotary-type mounting structure that enables favorable support performance for an in-vehicle device while curbing degradation in drop-off performance and a mounting base in the mounting structure.

Solution to Problem

A mounting structure according to this invention is a support stay mounting structure for an in-vehicle device, the support stay mounting structure including a mounting base to be mounted to a windshield surface of a cabin of a vehicle and a support stay to be mounted to the mounting base so as to be capable of dropping off from the mounting base, wherein: the mounting structure includes a structure in which a support stay mounting surface of the mounting base and a mounted surface of the support stay are made to face each other and the mounting base and the support stay are joined via a support stay mounting leaf spring so as to be capable of rotating relative to each other in a direction around a predetermined rotation axis crossing the surfaces facing each other; the support stay mounting surface and the mounted surface include respective abutment support structures that are formed in the direction around the rotation axis and abut against each other via a biasing force of the support stay mounting leaf spring; the mounting structure is configured in such a manner that when the support stay is rotated in the direction around the rotation axis against the biasing force of the support stay mounting leaf spring in a state in which the mounting base and the support stay are joined via the support stay mounting leaf spring, the support stay is mounted to the mounting base by increasing the biasing force of the support stay mounting leaf spring via the abutment support structures to bring the support stay mounting surface and the mounted surface into pressure-abutment with each other; the mounting structure is configured in such a manner that when an external force of a predetermined amount or more is applied to the support stay in a state in which the support stay is mounted to the mounting base, joining between the support stay and the mounting base is undone against the biasing force of the support stay mounting leaf spring by the external force to make the support stay drop off from the mounting base; the abutment support structures include a structure in which the support stay mounting surface and the mounted surface are made to abut against each other via a plurality of abutment support portions surrounding the rotation axis; and the plurality of abutment support portions includes a first abutment support portion disposed in an angle direction toward a lower side of a circumference around the rotation axis with the rotation axis as a center in a position in which the mounting base is fixed to a windshield surface of a cabin of a vehicle and the support stay is mounted to the mounting base. A load of an in-vehicle device is directed in the angle direction toward the lower side of the circumference of the rotation axis with the rotation axis as a center, and thus, the load of the in-vehicle device can efficiently be supported by the first abutment support portion by disposing the first abutment support portion in that angle direction. Consequently, vibration of the in-vehicle device body can be curbed by enhancing support performance for the in-vehicle device without an unnecessary increase in number of abutment support portions. As a result, it is possible to enhance support performance for the in-vehicle device while curbing degradation in drop-off performance.

It is possible that in a part or all of the plurality of abutment support portions, the support stay mounting surface and the mounted surface include a fitting structure including a dent and a bump that fit together in a state in which the support stay is mounted to the mounting base. Accordingly, a state in which the support stay is mounted to the mounting base can stably be maintained by the fitting structure. It is possible that: the first abutment support portion includes the fitting structure; and the fitting structure of the first abutment support portion includes a fitting groove that forms the dent, the fitting groove extending in the angle direction toward the lower side of the circumference around the rotation axis from among radial directions with the rotation axis as a center, and a fitting lug forming the bump, the fitting lug fitting in the fitting groove, in a position in which the mounting base is fixed to a windshield surface of a cabin of a vehicle and the support stay is mounted to the mounting base. Accordingly, the angle direction toward the lower side of the circumference around the rotation axis with the rotation axis as a center, in which the fitting groove of the first abutment support portion extends, corresponds to a sliding drop-off direction of the support stay, and when the support stay slides and drops off, the fitting lug slides in the fitting groove, enabling the fitting to be easily undone. In other words, when the support stay slides and drops off, the fitting lug does not need to climb over the fitting groove in a width direction of the fitting groove. Therefore, degradation in drop-off performance in the sliding drop-off direction of the support stay due to the fitting structure can be curbed.

It is possible that the plurality of abutment support portions include at least four second abutment support portions disposed in respective angle directions toward an upper left side, an upper right side, a lower left side and a lower right side of the circumference around the rotation axis with the rotation axis as a center in a position in which the mounting base is fixed to a windshield surface of a cabin of a vehicle and the support stay is mounted to the mounting base, in addition to the first abutment support portion. Accordingly, the support stay of the in-vehicle device can be supported by at least five abutment support portions (the first abutment support portion and the second abutment support portion) on all of the sides of the circumference around the rotation axis with the rotation axis as a center, enabling further enhancement in support performance for the in-vehicle device. It is possible that: in each of the second abutment support portions, the support stay mounting surface and the mounted surface include a fitting structure including a dent and a bump that fit together in a state in which the support stay is mounted to the mounting base; and the fitting structure of the second abutment support portion includes a fitting groove forming the dent, the fitting groove extending in a radial direction with the rotation axis as a center, and a fitting lug forming the bump, the fitting lug fitting in the fitting groove, in a position in which the mounting base is fixed to a windshield surface of a cabin of a vehicle and the support stay is mounted to the mounting base. Accordingly, a state in which the support stay is mounted to the mounting base is stably maintained by each of the second abutment support portions including the fitting structure, enabling further enhancement in support performance for the in-vehicle device. It is possible that a support surface of the abutment support structure in each of the second abutment support portions disposed in the angle directions toward the lower left side and the lower right side of the circumference around the rotation axis with the rotation axis as a center has a level difference between an area on a front end side in the sliding drop-off direction and an area in a rear end side in the sliding drop-off direction, with the fitting groove between the areas, for the fitting structure to easily come off in the sliding drop-off direction. Accordingly, the fitting structure of each of the second abutment support portions disposed in the angle directions toward the lower left side and the lower right side of the circumference around the rotation axis with the rotation axis as a center is easily undone in the sliding drop-off direction because of the level difference, enabling facilitating sliding drop-off.

In the mounting structure according to this invention, it is possible that a gap is formed in an area between the support stay mounting surface and the mounted surface, except places at which the support stay mounting surface and the mounted surface abut against each other via the abutment support structures, in a state in which the support stay is mounted to the mounting base. Accordingly, a harness, a harness connector, etc., can be disposed in the gap between the support stay mounting surface and the mounted surface.

It is possible that the mounting base includes a pawl receiving portion for cover mounting. Accordingly, a cover can directly be mounted to the mounting base, enabling eliminating the need for a structure for mounting the cover to a ceiling of the cabin.

Another mounting structure according to this invention can be a support stay mounting structure for an in-vehicle device, the support stay mounting structure including a mounting base to be mounted to a windshield surface of a cabin of a vehicle and a support stay to be mounted to the mounting base so as to be capable of dropping off from the mounting base, wherein: the mounting structure includes a structure in which a support stay mounting surface of the mounting base and a mounted surface of the support stay are made to face each other and the mounting base and the support stay are joined via a support stay mounting leaf spring so as to be capable of rotating relative to each other in a direction around a predetermined rotation axis crossing the surfaces facing each other; the support stay mounting surface and the mounted surface include respective abutment support structures that are formed in the direction around the rotation axis and abut against each other via a biasing force of the support stay mounting leaf spring; the mounting structure is configured in such a manner that when the support stay is rotated in the direction around the rotation axis against the biasing force of the support stay mounting leaf spring in a state in which the mounting base and the support stay are joined via the support stay mounting leaf spring, the support stay is mounted to the mounting base by increasing the biasing force of the support stay mounting leaf spring via the abutment support structures to bring the support stay mounting surface and the mounted surface into pressure-abutment with each other; the mounting structure is configured in such a manner that when an external force of a predetermined amount or more is applied to the support stay in a state in which the support stay is mounted to the mounting base, joining between the support stay and the mounting base is undone against the biasing force of the support stay mounting leaf spring by the external force to make the support stay drop off from the mounting base; the abutment support structures include a structure in which the support stay mounting surface and the mounted surface are made to abut against each other via a plurality of abutment support portions surrounding the rotation axis; in part or all of the plurality of abutment support portions, the support stay mounting surface and the mounted surface include a fitting structure including a dent and a bump that fit together in a state in which the support stay is mounted to the mounting base; and part or all of the fitting structures each include a fitting groove forming the dent, the fitting groove extending downward along the support stay mounting surface of the mounting base, and a fitting lug forming the bump, the fitting lug fitting in the fitting groove, in a position in which the mounting base is fixed to a windshield surface of a cabin of a vehicle and the support stay is mounted to the mounting base. Accordingly, the direction toward the lower side along the support stay mounting surface of the mounting base, in which the fitting groove extends, corresponds to a sliding drop-off direction of the support stay, and thus, when the support stay slides and drops off, the fitting lug slides in the fitting groove, enabling the fitting to be easily undone. In other words, when the support stay slides and drops off, the fitting lug does not need to climb over the fitting groove in a width direction of the fitting groove. Therefore, the fitting structure can contribute to supporting the in-vehicle device while curbing degradation in drop-off performance in the sliding drop-off direction of the support stay.

A mounting base according to this invention is a mounting base that is usable as the mounting base in the mounting structure according to this invention.

BRIEF DESCRIPTION OF DRAWINGS

FIG. 11A is a diagram of the mounting base in FIG. 1 installed on a windshield surface as viewed from just in front of a support stay mounting surface.

FIG. 11B is a diagram illustrating a contour shape of a support surface of the mounting base in FIG. 11A, an entire circumference of the support surface being developed in a direction around the rotation axis (direction of arrow R in FIG. 1A).

FIGS. 13 to 16 are diagrams illustrating steps of mounting the support stay to the mounting base in order, with regard to the inner mirror in FIG. 1. From among the figures, FIG. 13 illustrate a first step in which the support stay is pressed into the mounting base.

FIG. 14A is a diagram of the second step as viewed from just in front of the support stay mounting surface.

FIG. 15A is a diagram of the third step as viewed from just in front of the support stay mounting surface.

FIG. 16A is a diagram of the fourth step as viewed from just in front of the support stay mounting surface.

DESCRIPTION OF EMBODIMENT

Figure 1:
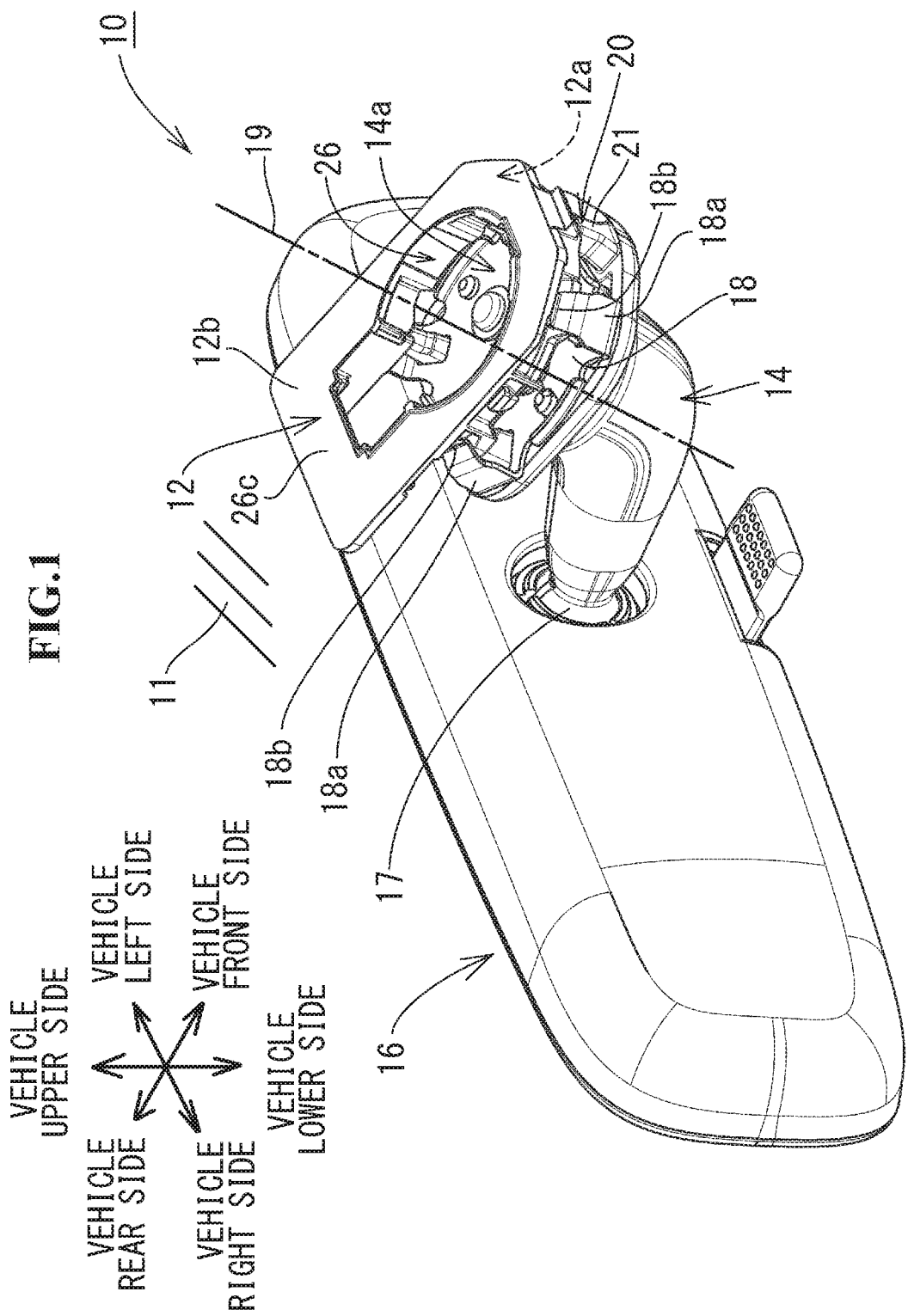
FIG. 1 is a diagram illustrating an embodiment of this invention and is a perspective diagram of an inner mirror for a vehicle as viewed from the upper side of the back side (vehicle front side). This figure illustrates the inner mirror mounted to a mounting base installed on a windshield, as viewed from the outside of the vehicle through the windshield. The illustration is provided with a sensor sub-assembly (hereinafter referred to as "sensor") and a cover and an auxiliary cover removed.

An embodiment of this invention will be described. FIG. 1 illustrates an embodiment of an inner mirror for a vehicle, to which this invention is applied. FIG. 1 illustrates an inner mirror 10 mounted to a mounting base 12 bonded to a windshield 11, as viewed from the outside of the vehicle through the windshield 11. The illustration is provided with a sensor and a cover removed. The mounting base 12 is mounted to the windshield 11 by bonding a bonding surface 12b to a surface on the cabin side of the windshield 11 of the vehicle. Therefore, the mounting base 12 is mounted to the windshield 11 in a position in which the bonding surface 12b is inclined so as to face the obliquely upper front side of the vehicle. A mirror body 16 is mounted to the mounting base 12 via a support stay 14. The mirror body 16 is formed of, e.g., a conventional mirror using a reflective mirror or an electronic mirror with an image display device such as a liquid-crystal display incorporated therein (which may be one with both an image display device and a reflective mirror provided therein). A support stay mounting leaf spring 18 is mounted to a proximal end (that is, an end on the side on which the mounting base 12 is mounted) of the support stay 14 via screw-fastening. The mirror body 16 is mounted to a terminal end (that is, an end on the side on which the mirror body 16 is mounted) of the support stay 14 in such a manner that a mirror angle can be adjusted via a pivot 17.

In a state in which the mounting base 12 is mounted to the windshield 11, the support stay 14 is mounted to the mounting base 12 according to the following procedure. Note that mounting of the mirror body 16 to the support stay 14 is performed before or after mounting of the support stay 14 to the mounting base 12. A support stay mounting surface 12a (that is, a surface to which the support stay 14 is to be mounted) of a mounting base 12 and a mounted surface 14a (that is, a surface which is to be mounted to the mounting base 12) of the support stay 14 are made to face each other. Consequently, four legs 18a of the support stay mounting leaf spring 18 protrudes in a direction toward the mounting base 12. The support stay 14 is made to approach the mounting base 12, and respective free ends of the four legs 18a of the support stay mounting leaf spring 18 are pressed into and thereby engaged with the mounting base 12. Consequently, the mounting base 12 and the support stay 14 are joined to each other via the support stay mounting leaf spring 18. The support stay 14 is rotated in a direction around a rotation axis 19. Here, the rotation axis 19 is an axis that extends through respective centers of the support stay mounting surface 12a and the mounted surface 14a facing each other and is perpendicular to the support stay mounting surface 12a and the mounted surface 14a. Respective abutment support structures 20 that extend in the direction around the rotation axis 19 and abut against each other and slide relative to each other are formed at the support stay mounting surface 12a and the mounted surface 14a. The support stay mounting surface 12a and the mounted surface 14a abut against each other at the abutment support structures 20 by means of a biasing force of the support stay mounting leaf spring 18. Upon the support stay 14 being rotated around the rotation axis 19 in a mounting direction (here, a clockwise direction as viewed from a worker for mounting work) against the biasing force of the legs 18a, a distance between the support stay mounting surface 12a and the mounted surface 14a are widened by the abutment support structures 20, and accordingly, the biasing force of the legs 18a increases. At the time of the support stay 14 being rotated by a predetermined amount, the rotation of the support stay 14 is stopped. Consequently, the support stay mounting surface 12a and the mounted surface 14a are pressed and abut against each other via the abutment support structures 20 by means of the biasing force of the support stay mounting leaf spring 18, and as a result, the support stay 14 is mounted to the mounting base 12. Upon application of a large external force of a predetermined amount or more to the mirror body 16 in the state in FIG. 1 in which the inner mirror 10 is mounted to the windshield 11, the external force is applied to the mounting base 12 via the support stay 14 and the engagement between the legs 18a and the mounting base 12 is undone against the biasing force of the legs 18a. As a result, the support stay 14 drops off from the mounting base 12. Note that as modes of action of the support stay 14 dropping off from the mounting base 12, there are "rotational drop-off" and "sliding drop-off" depending on the direction of the external force applied to the mirror body 16. Rotational drop-off is an action of the support stay 14 rotating with one arbitrary position in a circumferential direction of the support stay mounting surface 12a of the mounting base 12, as a point of support, and dropping off from the mounting base 12. In other words, the support stay 14 rotates in such a manner that a part, on the side opposite to the point of support, of the support stay 14 is removed from the mounting base 12 (that is, moved away from the windshield 11), and thereby dropping off from the mounting base 12. Sliding drop-off is an action of the support stay 14 sliding toward the obliquely lower side of the vehicle front side along an inclination of the support stay mounting surface 12a of the mounting base 12 (that is, along an inclination of the windshield 11) and thereby dropping off from the mounting base 12.

Figure 2:
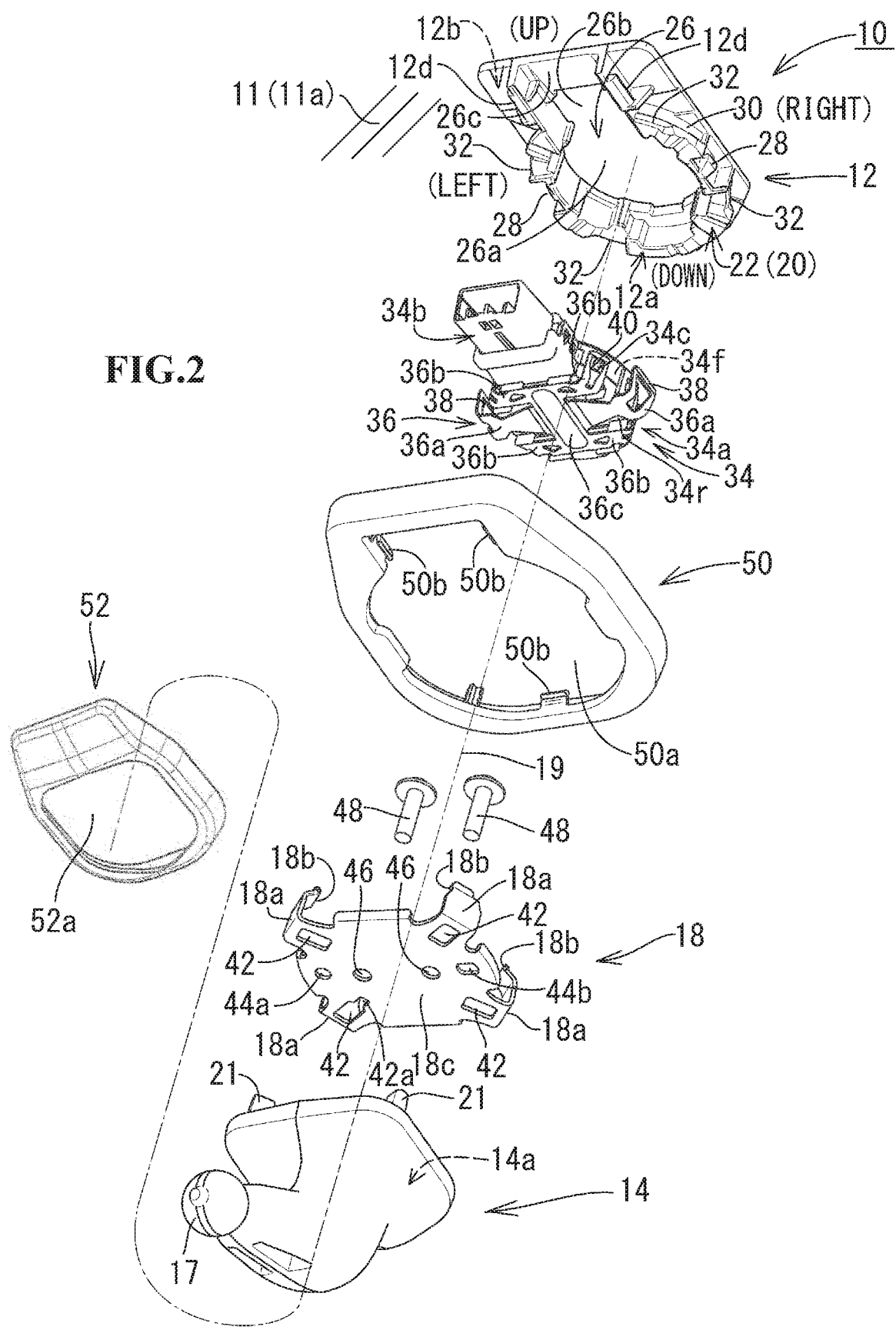
FIG. 2 is an exploded perspective view of the inner mirror in FIG. 1. Illustration of a mirror body is omitted. The sensor and a sensor assembling leaf spring are illustrated in a state in which the sensor and the leaf spring are assembled.

FIG. 2 illustrates the inner mirror 10 in FIG. 1 disassembled into respective components. Illustration of the mirror body 16 is omitted. Also, a sensor and a sensor assembling leaf spring are illustrated in a state in which the sensor and a sensor assembling leaf spring are assembled. The respective components will be described. In the below description, respective directions of "up (upper)", "down (lower)", "left" and "right" in the direction around the rotation axis 19 of each of the components are expressed with reference to the following position. In other words, the reference position is a position in which the rotation axis 19 is viewed in the axis direction from the support stay 14 side toward the mounting base 12 side when the inner mirror 10 is mounted to the windshield.

<<Mounting Base 12>>

The entire mounting base 12 is formed of a single piece of a material such as a glass fiber-reinforced resin or a steel. A sensor assembling void 26 is formed in a surface of the mounting base 12. The sensor assembling void 26 includes a sensor body receiving portion 26a and a connector receiving portion 26b. The sensor body receiving portion 26a is formed as a void having a round shape with the rotation axis 19 as a center. The sensor body receiving portion 26a is formed so as to extend through the front and the back of the mounting base 12. The connector receiving portion 26b is formed as a rectangular void that communicates with a part in the circumferential direction of the sensor body receiving portion 26a and extends in a radial direction with the rotation axis 19 as a center. Left and right walls on the front end side of the connector receiving portion 26b are joined to each other via a joining portion 26c. The mounting base 12 is mounted to a surface (windshield surface) 11a on the cabin side of the windshield 11 by bonding in a state in which the connector receiving portion 26b is disposed on the upper side. In the support stay mounting surface 12a, an undulating support surface 22 is formed adjacent to the sensor body receiving portion 26a on the outer circumferential side of the sensor body receiving portion 26a. The support surface 22 forms a mounting base 12-side structure of the abutment support structures 20. The support surface 22 is formed so as to extend in the circumferential direction with the rotation axis 19 as a center. Respective mounting base-side leaf spring mounting portions 28 are formed at positions on the left and right sides of an outer circumferential surface of the support stay mounting surface 12a. Here, the mounting base-side leaf spring mounting portions 28 are formed as engagement pawls for pawl engagement. In the outer circumferential surface of the support stay mounting surface 12a, a circumferential groove 30 is formed so as to extend in the circumferential direction at each of four positions that are upper left, upper right, lower left and lower right positions. A counterclockwise end in the circumferential direction of each circumferential groove 30 communicates with a relevant entrance 32 that opens to the support stay mounting surface 12a side. When the support stay 14 is to be mounted to the mounting base 12, the entrances 32 allow pawls 18b at the free ends of the legs 18a of the support stay mounting leaf spring 18 to move in a direction along the rotation axis 19 and enter the respective entrances 32. The circumferential grooves 30 engage with the pawls 18b that has entered the entrances 32 and allow the pawls 18b to move (slide) in the direction around the rotation axis 19 along the circumferential grooves 30 while locking the pawls 18b so as to prevent the pawls 18b from moving in the direction along the rotation axis 19.

<<Sensor 34 and Sensor Assembling Leaf Spring 36>>

The sensor 34 is formed, for example, as a sensor subassembly in which what is called a rain sensor or a rain-light sensor is disposed inside a resin case. The sensor 34 includes a sensor body 34a and a connector 34b. A sensor element, a substrate. etc., are housed in the sensor body 34a. A vehicle-side sensor harness (not illustrated) is connected to the connector 34b. In an outer circumferential surface of the sensor body 34a, a sensor-side leaf spring mounting portion 34c is formed at each of four positions, upper left, upper right, lower left and lower right positions, in the circumferential direction. Here, the sensor-side leaf spring mounting portions 34c are formed as engagement pawls for pawl engagement. A sensor assembling leaf spring 36 is formed of a single leaf spring of a metal material such as steel. A sensor pressing portion 36c facing a back surface (non-sensing surface) 34r of the sensor 34 is disposed at a center of the sensor assembling leaf spring 36. Two mounting base mounting legs 36a and four sensor mounting legs 36b are disposed radially from the sensor pressing portion 36c. The sensor assembling leaf spring 36 is configured in this way. Free ends of the six legs 36a, 36b are flexed in a direction toward the windshield 11 so as to surround the sensor 34. A mounting base mounted portion 38 is formed at each of the free ends of the mounting base mounting legs 36a. A sensor mounted portion 40 is formed at each of the free ends of the sensor mounting legs 36b. Here, the mounting base mounted portions 38 and the sensor mounted portions 40 are formed as pawl engagement holes for pawl engagement. The sensor assembling leaf spring 36 is mounted to the sensor 34 by the four sensor mounted portions 40 being brought into pawl engagement with the four sensor-side leaf spring mounting portions 34c, respectively. At this time, the sensor pressing portion 36c abuts on the back surface 34r of the sensor 34 with pressure by a biasing force of the sensor assembling leaf spring 36, and thus, the sensor assembling leaf spring 36 is mounted to the sensor 34 with no backlash. In a state in which the sensor assembling leaf spring 36 is mounted to the sensor 34, the sensor 34 is inserted to the sensor assembling void 26 of the mounting base 12, and the mounting base mounted portions 38 at two, left and right, positions in the sensor assembling leaf spring 36 is brought into pawl engagement with the mounting base-side leaf spring mounting portions 28 at two, left and right, positions in the mounting base 12. Consequently, the sensor 34 is mounted to the mounting base 12 via the sensor assembling leaf spring 36. In a state in which the mounting base 12 is mounted to the windshield, a front surface (sensing surface) 34f of the sensor 34 is pressed against the windshield surface 11a by the biasing force of the sensor assembling leaf spring 36. In this way, the sensor 34 is received in the sensor assembling void 26 and the sensing surface 34f is stably held in a state in which the sensing surface 34f is pressed against the windshield surface 11a.

<<Support Stay 14>>

The entire support stay 14 is formed of a single piece of a material such as a glass fiber-reinforced resin or a steel. Five protrusions 21 are formed in a protruding manner at the mounted surface 14a of the support stay 14 so as to surround the rotation axis 19. The protrusions 21 form a support stay 14-side structure of the abutment support structures 20. Heights of tops of the five protrusion 21 are equal to one another. In other words, the tops of the five protrusions 21 are disposed on a same plane perpendicular to the rotation axis 19.

<<Support Stay Mounting Leaf Spring 18>>

The support stay mounting leaf spring 18 is formed of one leaf spring of a metal material such as steel. A support stay mounting portion 18c to be placed and supported on the mounted surface 14a of the support stay 14 is disposed at a center of the support stay mounting leaf spring 18. The four legs 18a are disposed radially from the support stay mounting portion 18c. The support stay mounting leaf spring 18 is configured in this way. The legs 18a are flexed relative to the support stay mounting portion 18c in the direction toward the mounting base 12. The free ends of the leg 18a are flexed inward and thereby form the pawls 18b. The total four pawls 18b are disposed at respective positions that are the same in the radial direction (that is, on a same circle) relative to the rotation axis 19. Of circumferential edges 18d, 18e (see FIG. 5B) of an inner circumferential surface of each pawl 18b, a circumferential edge 18d on the front-end side in the rotary mounting direction is chamfered to form a C-surface. Consequently, when the support stay 14 is rotated in the mounting direction that is a direction around the rotation axis 19 in order to mount the support stay 14 on the mounting base 12, the mounting is facilitated by reduction in sliding resistance between the pawls 18b and the circumferential grooves 30. On the other hand, the circumferential edges 18e on the rear-end side in the rotary mounting direction are not chamfered. Consequently, the sliding resistance between the pawls 18b and the circumferential grooves 30 are made to be large in a return direction (removal direction) and the support stay 14 is thereby prevented from spontaneously rotating in the return direction because of, e.g., vibration of the vehicle. In FIG. 2, four protrusion insertion holes 42, two positioning holes 44a, 44b for positioning relative to the mounted surface 14a and two screw through holes 46 are provided in the support stay mounting portion 18c. The four protrusion insertion holes 42 allow four protrusions 21, on the left and right sides, of the five protrusions 21 to be inserted therethrough. The protrusion insertion holes 42 are formed at respective positions that are the same as those of the legs 18a in the circumferential direction and are on the inner circumferential side relative to the legs 18a, with reference to the rotation axis 19. An erroneous assembling preventing cutout 42a (see FIG. 4) is formed in one of the four protrusion insertion holes 42. Correspondingly, an erroneous assembling preventing rib 21b (see FIG. 4) to be made to enter the erroneous assembling preventing cutout 42a is formed at one of the four protrusions 21 on the left and right sides. The support stay mounting leaf spring 18 is assembled to the support stay 14 by adjusting a direction of the support stay mounting leaf spring 18 to a direction in which the erroneous assembling preventing rib 21b is inserted to the erroneous assembling preventing cutout 42a and inserting the four protrusions 21 to the four protrusion insertion holes 42. Consequently, the support stay mounting leaf spring 18 is prevented from being mounted to the support stay 14 in an erroneous direction (that is, reversely in the front-rear direction). The positioning hole 44a is a hole for a reference pin and the positioning hole 44b is a hole for a width-across-flats pin. The support stay mounting leaf spring 18 is mounted to the mounted surface 14a of the support stay 14 via two tapping screws 48. Upon the support stay mounting leaf spring 18 being mounted to the mounted surface 14a, the four protrusions 21 on the left and right sides of the five protrusions 21 are disposed at respective positions that are the same as those of the legs 18a in the circumferential direction and are on the inner circumferential side relative to the legs 18a.

<<Cover 50 and Auxiliary Cover 52>>

Each of a cover 50 and an auxiliary cover 52 is formed of a resin. The cover 50 includes an opening 50a. The auxiliary cover 52 includes an opening 52a. The cover 50 is mounted to the mounting base 12 by means of pawl engagement. In the cover 50, a plurality of engagement pawls 50b for the pawl engagement are formed at respective positions at which the plurality of engagement pawls 50b face the opening 50a. On the other hand, pawl receiving portions 12d that engage with the respective engagement pawls 50b are formed in the mounting base 12. The cover 50 is mounted to the mounting base 12 by bringing the engagement pawls 50b into pawl engagement with the respective pawl receiving portions 12d. The auxiliary cover 52 is mounted to the cover 50 by means of pawl engagement. The cover 50 and the auxiliary cover 52 enable the mounting base 12 and the part of joining between the mounting base 12 and the support stay 14 to be hidden from the outside. Since the cover 50 and the auxiliary cover 52 are intended to hide the mounting base 12 and the part of joining between the mounting base 12 and the support stay 14 from the outside (that is, only need to hide these parts), the cover 50 and the auxiliary cover 52 can be configured to be small. Even if a large external force is applied to the support stay 14 and thereby drops off from the mounting base 12, the cover 50 is maintained in a state in which the cover 50 is mounted to the mounting base 12.

Steps for assembling the above-described components and mounting the inner mirror 10 to the windshield 11 will be described.

<<Step of Mounting the Sensor and the Cover to the Mounting Base>>

Figure 3:
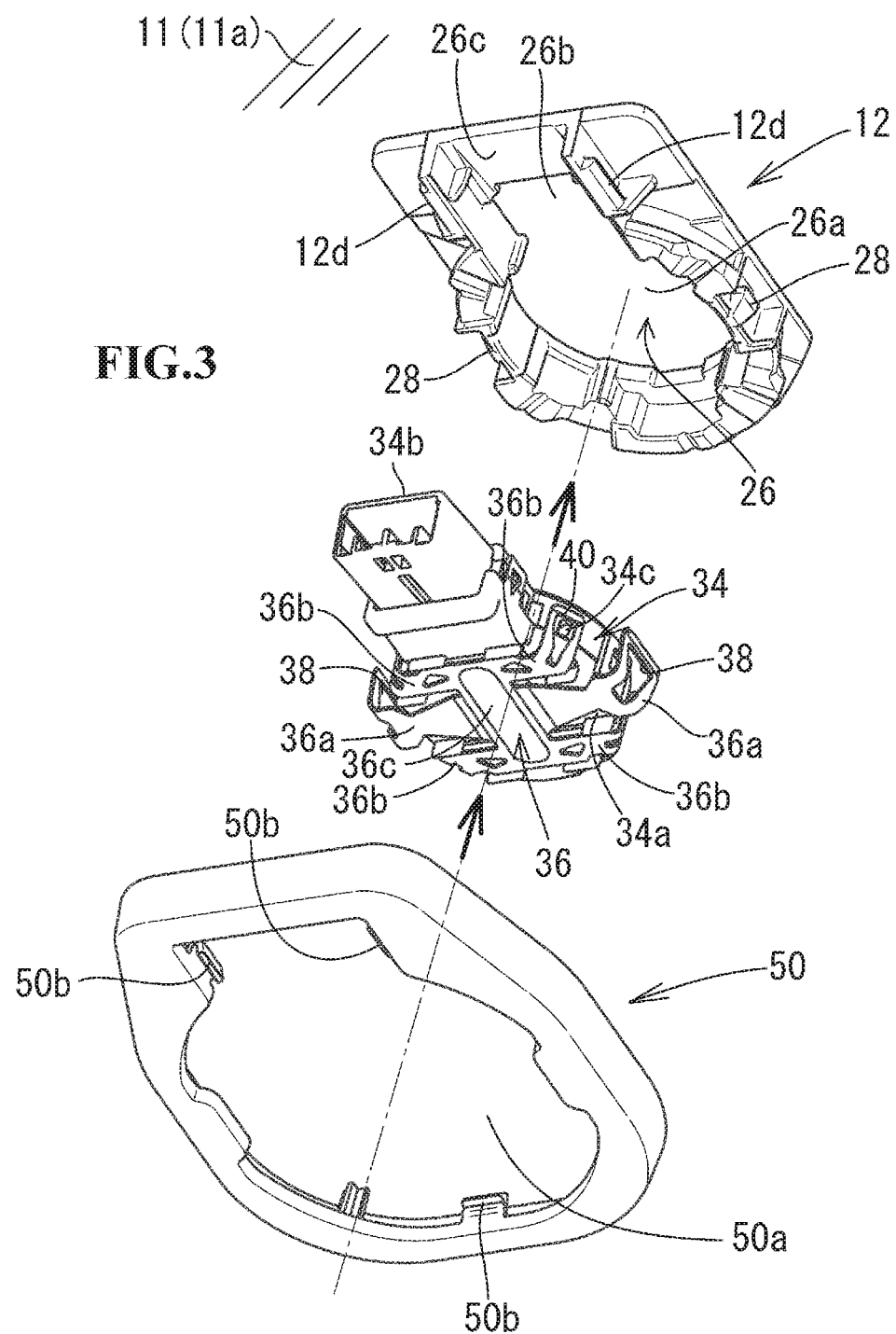
FIG. 3 is a perspective diagram illustrating a manner of mounting the sensor and the cover to the mounting base, with regard to the inner mirror in FIG. 1.

FIG. 3 illustrates a step of mounting the sensor 34 and the cover 50 to the mounting base 12. The mounting base 12 is bonded to the windshield surface 11a in advance. Also, the sensor 34 and the sensor assembling leaf spring 36 are assembled in advance. In this way, assembling the sensor 34 and the sensor assembling leaf spring 36 in advance enables the subsequent steps to be performed easily. The sensor 34 is inserted and received in the sensor assembling void 26. The sensor assembling leaf spring 36 is mounted to the mounting base 12 by bringing the mounting base-side leaf spring mounting portions 28 (engagement pawls) of the mounting base 12 into pawl engagement with the left and right mounting base mounted portions 38 (pawl engagement holes) of the sensor assembling leaf spring 36. Consequently, the sensor 34 is mounted to the mounting base 12. As a result, the front surface, that is, the sensing surface 34f of the sensor 34, is pressed against the windshield surface 11a by the biasing force of the sensor assembling leaf spring 36. In this way, before mounting of the support stay 14 to the mounting base 12, the sensor 34 is stably held on the mounting base 12 in a state in which the sensor 34 is pressed against the windshield surface 11a. Subsequently, the connector of the vehicle-side sensor harness is connected to the connector 34b of the sensor 34, and furthermore, the cover 50 is mounted to the mounting base 12 via pawl engagement. The state after mounting of the cover 50 is illustrated on the upper side of FIG. 6.

<<Step of Mounting the Support Stay Mounting Leaf Spring to the Support Stay>>

Figure 4:
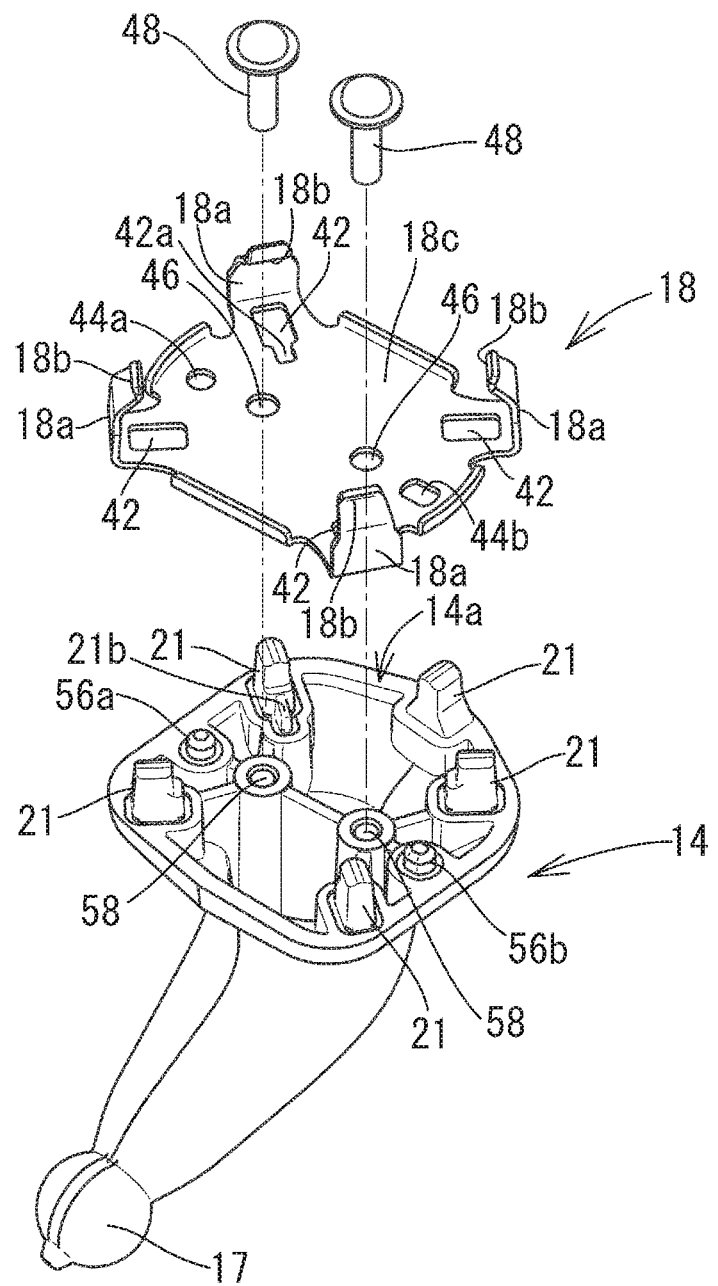
FIG. 4 is a perspective diagram illustrating a manner of mounting a support stay mounting leaf spring to a support stay, with regard to the inner mirror in FIG. 1.
Figure 5A:
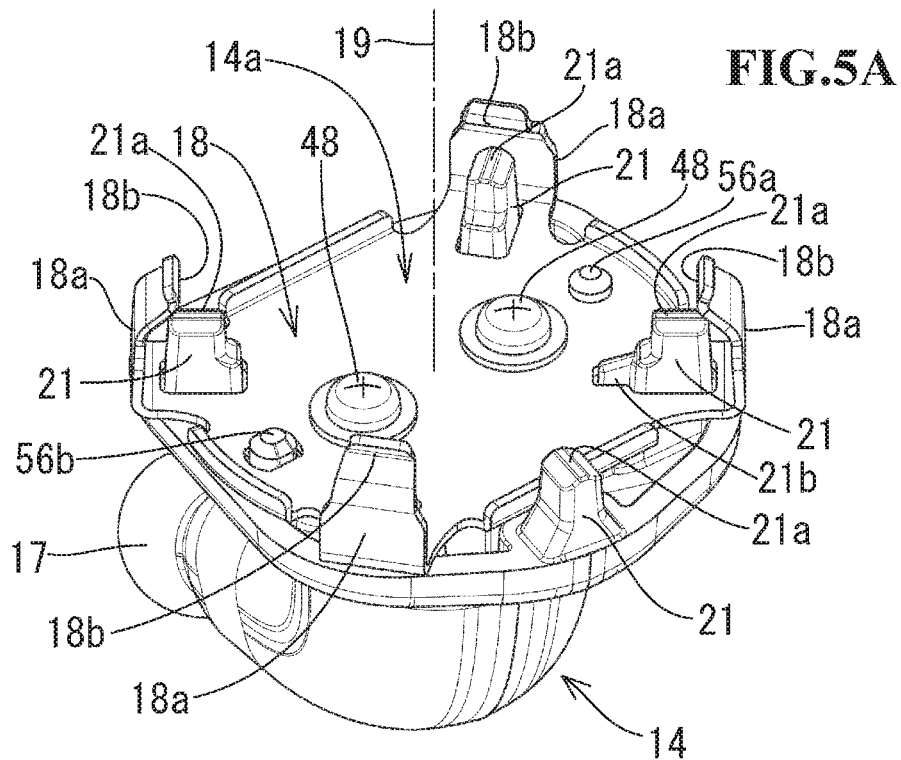
FIG. 5A is a diagram illustrating a state in which the leaf spring for support stay mounting is mounted to the support stay, with regard to the inner mirror in FIG. 1 and illustrates a state as a mounted surface is viewed obliquely from above.
Figure 5B:
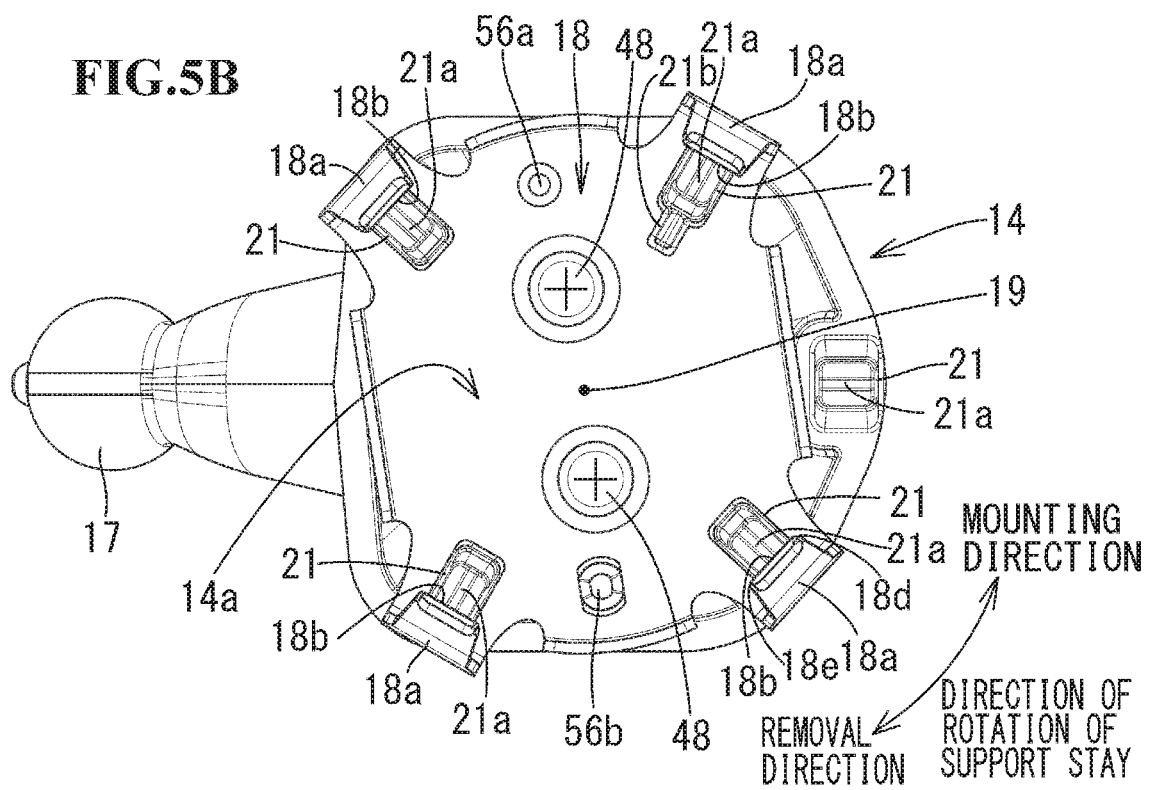
FIG. 5B is a diagram illustrating a state in which the support stay mounting leaf spring is mounted to the support stay, with regard to the inner mirror in FIG. 1 and illustrates a state as the mounted surface is viewed from the front.

FIG. 4 illustrates a step of mounting the support stay mounting leaf spring 18 to the support stay 14. The five protrusions 21, two positioning pins 56a, 56b and two screw holes 58 are formed in the mounted surface 14a of the support stay. The positioning pin 56a is a reference pin and the positioning pin 56b is a width-across-flats pin. The support stay mounting leaf spring 18 is placed on the mounted surface 14a of the support stay 14 by making the support stay mounting leaf spring 18 face the mounted surface 14a, inserting the protrusions 21 to the protrusion insertion holes 42, inserting the reference pin 56a to the positioning hole 44a and inserting the width-across-flats pin 56b to the positioning hole 44b. Subsequently, two tapping screws 48 are inserted to the two screw through holes 46 and screwed into the screw holes 58. Consequently, the support stay mounting leaf spring 18 is mounted to the mounted surface 14a of the support stay 14 with the support stay mounting portion 18c of the support stay mounting leaf spring 18 placed and supported on the mounted surface 14a of the support stay 14. FIGS. 5A and 5B each illustrate a state in which mounting of the support stay mounting leaf swing 18 on the mounted surface 14a is completed. The four legs 18a are disposed so as to surround the rotation axis 19, at respective positions that are the same in the radial direction with reference to the rotation axis 19. The four protrusions 21 are disposed so as to surround the rotation axis 19, at respective positions that are the same as those of the four legs 18a in the circumferential direction and are mutually the same in the radial direction on the inner circumferential side relative to the legs 18a, with reference to the rotation axis 19. The tops of the protrusions 21 each form a mound-like fitting lug 21a.

<<Step of Mounting the Support Stay on the Mounting Base>>

Figure 6:
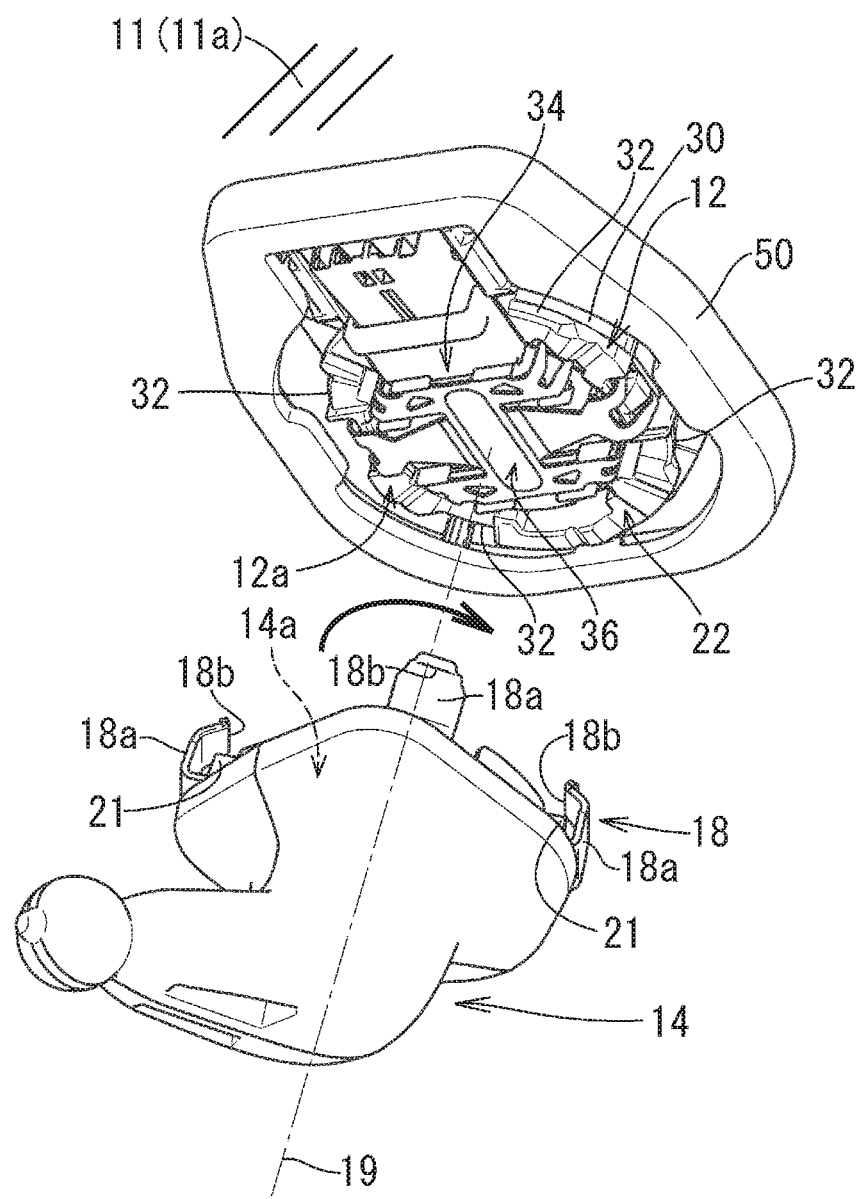
FIG. 6 is a perspective diagram illustrating a manner of mounting the support stay to the mounting base with the sensor and the cover mounted thereto, with regard to the inner mirror in FIG. 1.

After completion of assembling of the mounting base 12-side components and the support stay 14-side components through the above steps, the support stay 14 is mounted to the mounting base 12. FIG. 6 illustrates a step of mounting the support stay 14 to the mounting base 12. A worker holds the support stay 14 and makes the mounted surface 14a of the support stay 14 face the support stay mounting surface 12a of the mounting base 12. The worker moves the support stay 14 in a direction toward the mounting base 12 along the rotation axis 19, make the pawls 18b of the four legs 18a enter the entrances 32 and presses the pawls 18b into the entrances 32 to engage the pawls 18b with the circumferential groove 30. Consequently, the support stay 14 is loosely joined to the mounting base 12 to the extent that the support stay 14 does not drop off under its own weight. Upon the worker rotating the support stay 14 in the clockwise direction with his/her hand from this state, the pawls 18b slide on the circumferential grooves 30 and move along the circumferential grooves 30. Consequently, the pawls 18b reach respective positions off from the entrances 32 and the support stay 14 does not come off from the mounting base 12 with a small force. However, there is still backlash between the mounting base 12 and the support stay 14. Upon the worker further rotating the support stay 14 in the clockwise direction, a distance between the support stay mounting surface 12a and the mounted surface 14a is widened by the abutment support structures 20 against the biasing force of the legs 18a. Here, the abutment support structures 20 are formed of the undulating support surface 22 of the support stay mounting surface 12a and the protrusions 21 forming a supported surface of the mounted surface 14a. Accordingly, the biasing force of the legs 18a increases and the support surface 22 and the protrusions 21 strongly press and abut against each other. In this state, rotation of the support stay 14 is stopped and the support stay 14 is mounted to the mounting base 12. At this time, since the total four pawls 18b are disposed at respective circumferential positions that are the same as those of the parts of abutment between the support surface 22 and the protrusions 21 and are just on the outer circumferential side relative to the abutment parts, with reference to the rotation axis 19, it is possible to transmit the biasing force of the legs 18a to the abutment parts with good efficiency and stably maintain the mounted state. In the state in which the support stay 14 is mounted to the mounting base 12, the support stay 14 are not in contact with the sensor 34 and the sensor assembling leaf spring 36. Therefore, in mounting the support stay 14 to the mounting base 12, displacement of the sensor 34 from a correct position is curbed, enabling provision of good precision of assembling of the sensor 34. Consequently, mounting of the support stay 14 to the windshield surface 11a is completed.

<<Step of Mounting the Mirror Body on the Support Stay>>

Before or after mounting of the support stay 14 to the mounting base 12, mounting of the mirror body 16 (FIG. 1) to the support stay 14 is performed. In performing mounting of the mirror body 16 to the support stay 14, the support stay 14 is inserted through the opening 52a of the auxiliary cover 52 (FIG. 2) in advance. Mounting of the mirror body 16 to the support stay 14 is performed by mounting the mirror body 16 to the pivot 17 of the support stay 14. The auxiliary cover 52 is mounted to the cover 50 by being fitted in the cover 50 in a state in which the support stay 14 is mounted to the mounting base 12. All of the steps end with the mounting of the auxiliary cover 52.

Figure 7A:
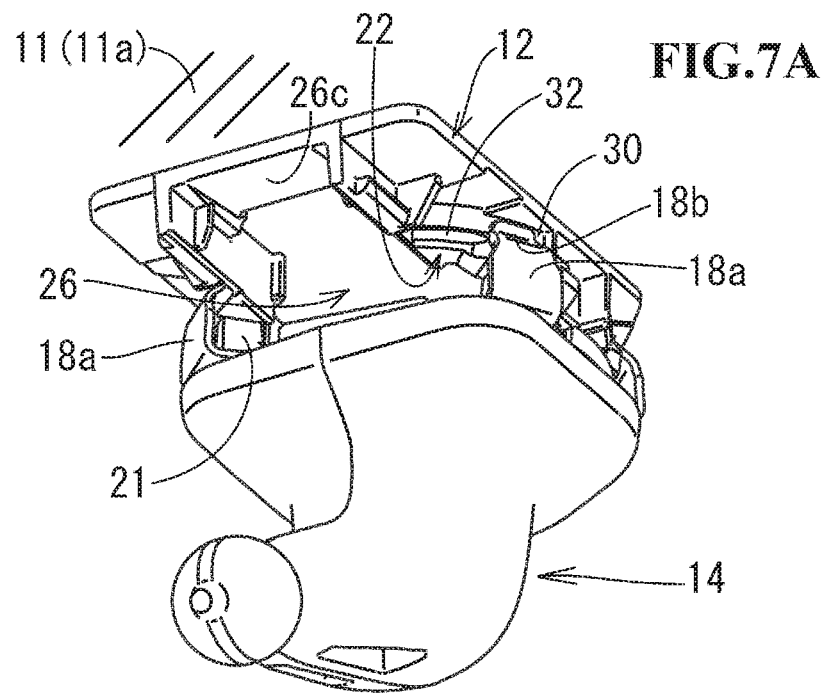
FIG. 7A is a perspective diagram illustrating a state in which mounting of the support stay to the mounting base is completed, with regard to the inner mirror in FIG. 1. The illustration is provided with the sensor, the cover, the auxiliary cover and the mirror body removed.
Figure 7B:
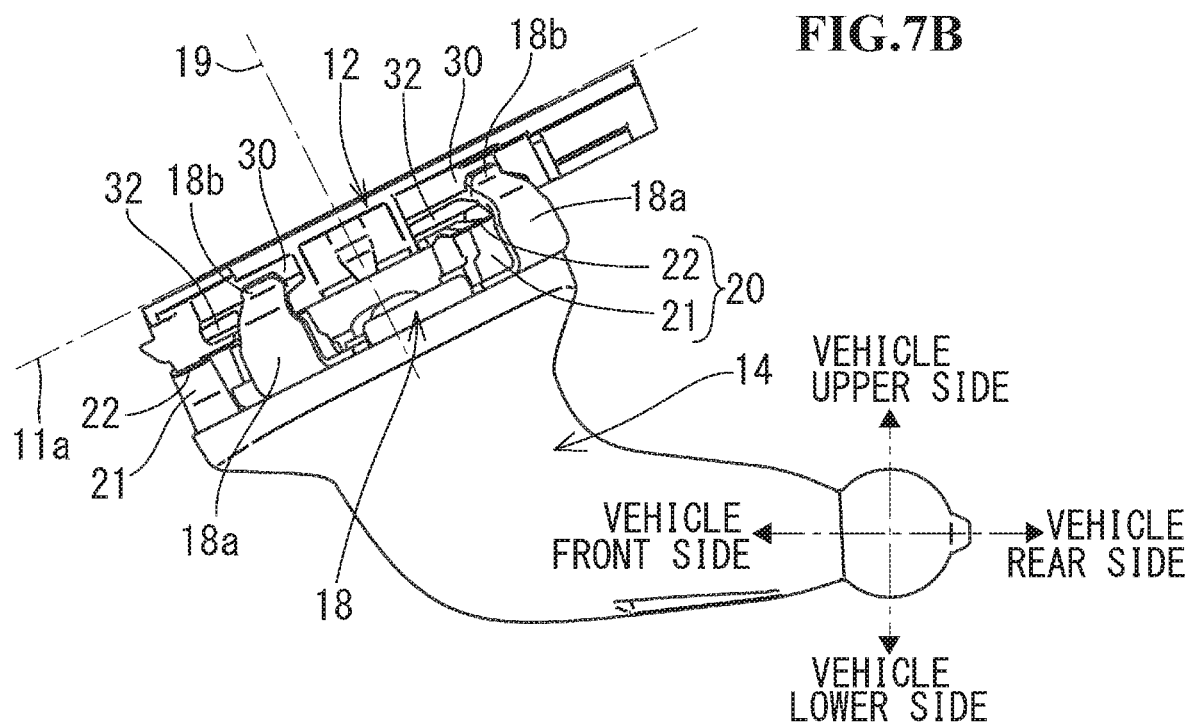
FIG. 7B is a side view of the state illustrated in FIG. 7A.
Figure 8A:
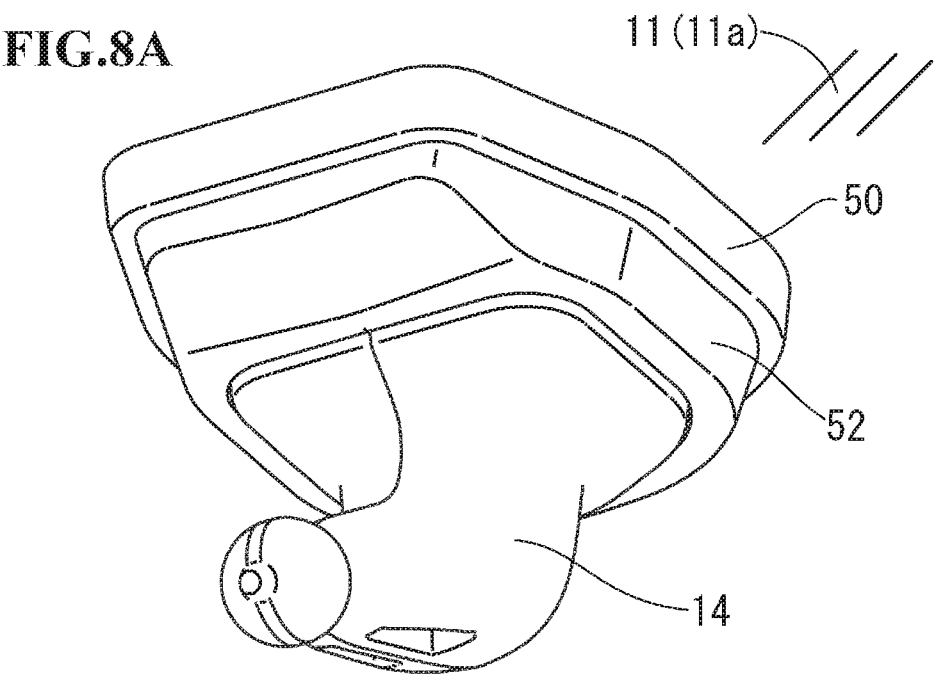
FIG. 8A is a perspective diagram illustrating a state in which mounting of the support stay to the mounting base is completed with regard to the inner mirror in FIG. 1. The illustration is provided with the cover and the auxiliary cover mounted.
Figure 8B:
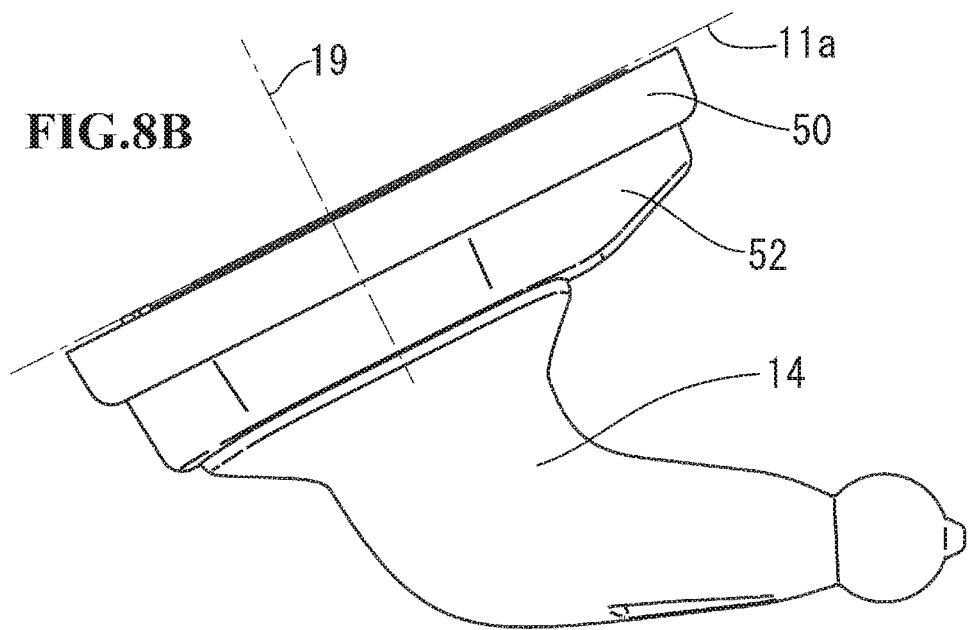
FIG. 8B is a side view of the state illustrated in FIG. 8A.
Figure 9A:
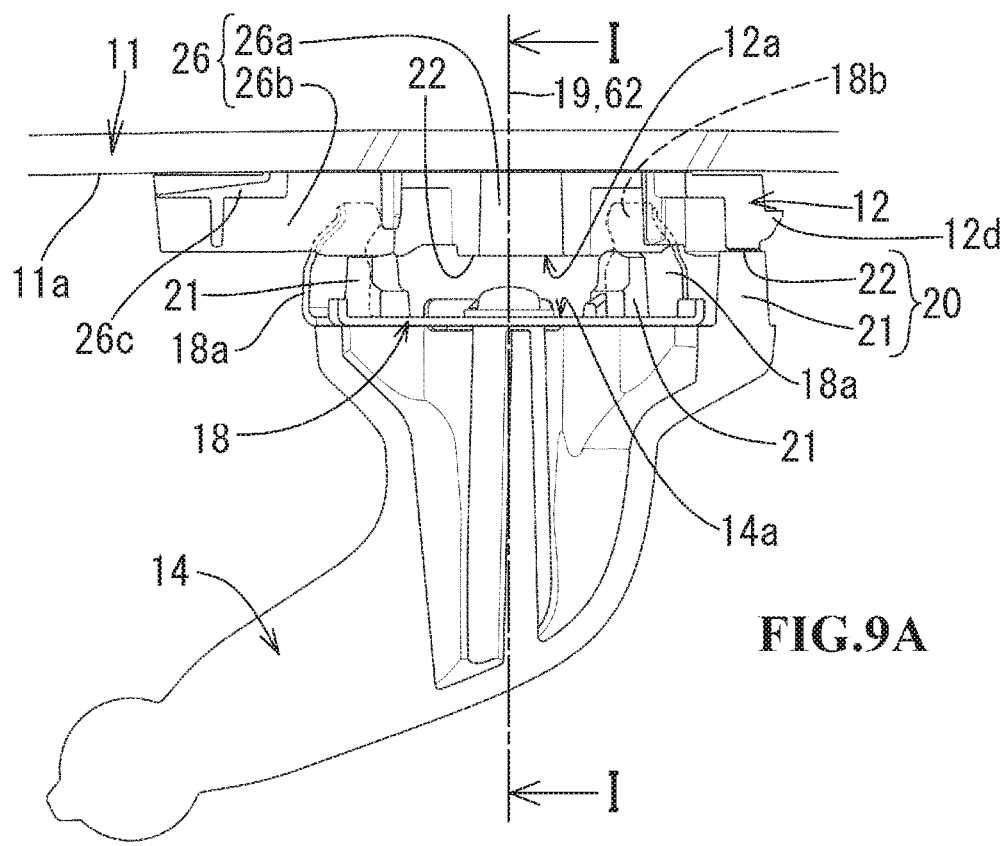
FIG. 9A is a diagram illustrating a state in which mounting of the support stay to the mounting base is completed, with regard to the inner mirror in FIG. 1. This figure is a sectional view at the position indicated by arrows II-II in FIG. 9B (that is, a sectional view along a vertical plane extending through a rotation axis in a vehicle front-rear direction). The illustration is provided with the sensor, the cover, the auxiliary cover and the mirror body removed.
Figure 9B:
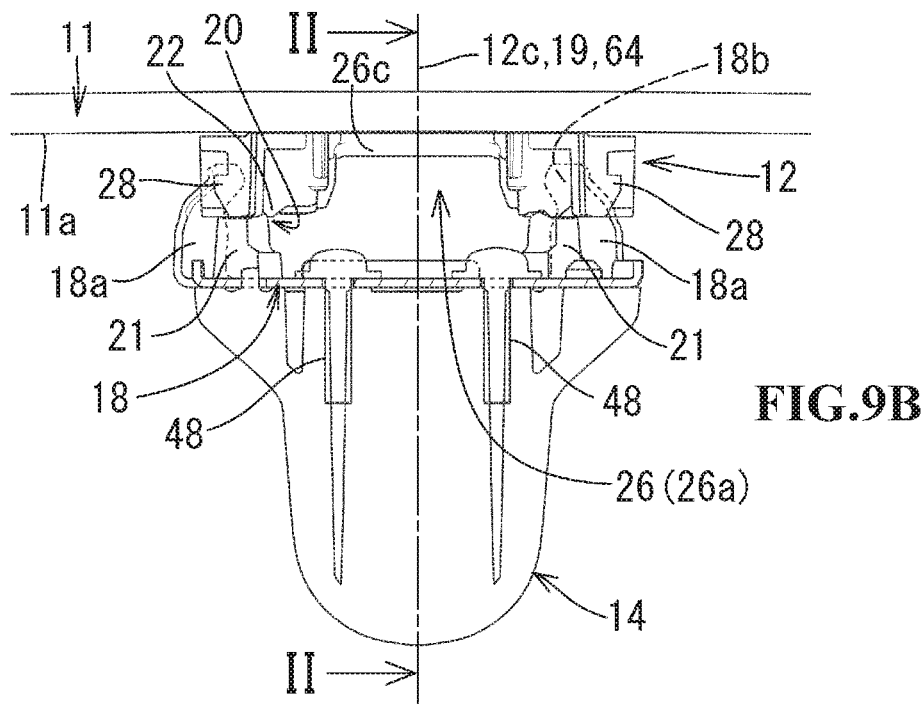
FIG. 9B is a sectional view at the position indicated by arrows I-I in FIG. 9A (that is, a sectional view along a non-vertical plane extending through the rotation axis in a vehicle left-right direction).
Figure 10A:
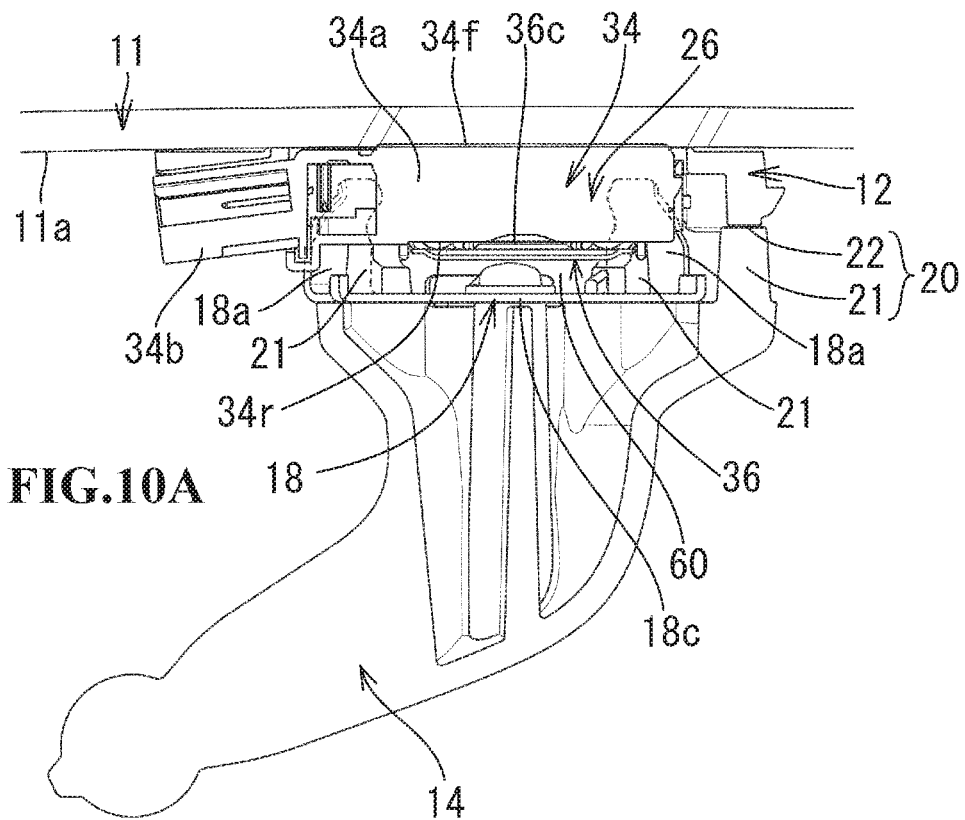
FIG. 10A is a sectional view at a position that is the same as that of FIG. 9A and illustrates a state in which the sensor is mounted.
Figure 10B:
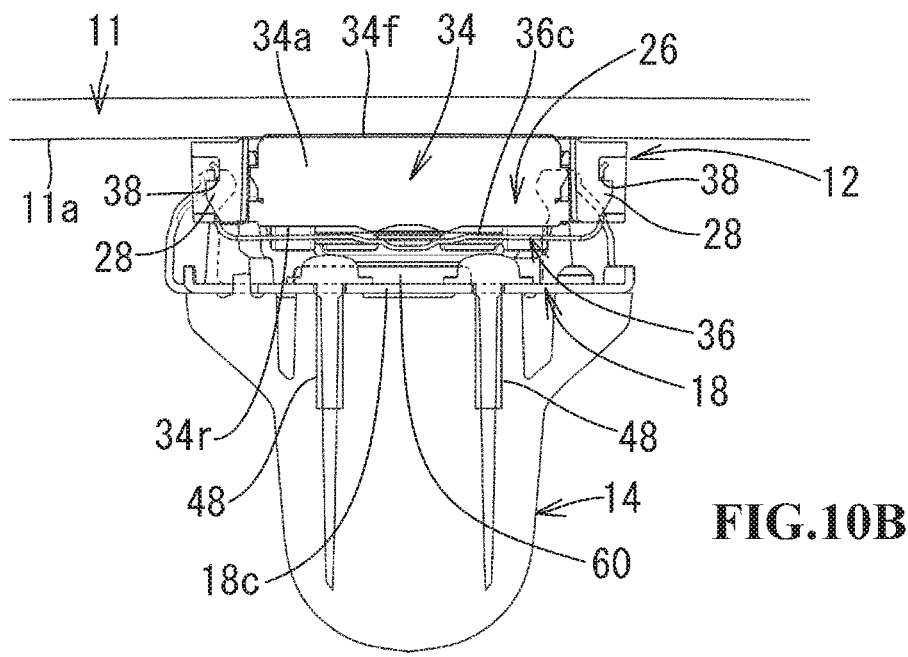
FIG. 10B is a sectional view at a position that is the same as that of FIG. 9B and illustrates a state in which the sensor is mounted.

A structure of the mounting part in a state in which the mounting of the support stay 14 to the windshield surface 11a is completed will be described with reference to FIGS. 7 to 10. Note that illustration of the mirror body 16 is omitted in FIGS. 7 to 10. FIGS. 7A and 7B each illustrate a state in which mounting of the support stay 14 to the windshield surface 11a is completed, with the sensor 34, the cover 50 and the auxiliary cover 52 removed. FIGS. 8A and 8B each illustrate that state, with the cover 50 and the auxiliary cover 52 mounted. FIG. 9A illustrates a section of that state at the position indicated by arrows II-II in FIG. 9B, that is, a section of that state cut along a vertical plane 64 extending through the rotation axis 19 in the vehicle front-rear direction (that is, a plane orthogonal to the sheet of FIG. 9B). FIG. 9B illustrates a section of that state at the position indicated by arrows I-I in FIG. 9A, that is, a section of that state cut along a non-vertical plane 62 extending through the rotation axis 19 in a vehicle left-right direction (that is, a plane orthogonal to the sheet of FIG. 9A). FIGS. 9A and 9B each illustrate the state with the sensor 34, the cover 50 and the auxiliary cover 52 removed. FIG. 10A illustrates a section at a position that is the same as that of FIG. 9A, with the sensor 34 mounted (with the cover 50 and the auxiliary cover 52 removed). FIG. 10B illustrates a section at a position that is the same as that of FIG. 9B, with the sensor 34 mounted (with the cover 50 and the auxiliary cover 52 removed). As illustrated in FIGS. 7A and 7B, the pawls 18b of the four legs 18a are made to enter from the entrances 32 and rotated in the direction around the rotation axis 19 and thereby engage with the circumferential grooves 30. Also, the support surface 22 and the protrusions 21 forming the supported surface are strongly pressed and abut against each other at five places in the direction around the rotation axis 19, by the biasing force of the legs 18a. Consequently, the support stay 14 is stably mounted to the windshield surface 11a. Also, as illustrated in FIGS. 8A and 8B, in a state in which the cover 50 and the auxiliary cover 52 are mounted, the mounting base 12 and the parts of joining between the mounting base 12 and the support stay 14 are hidden from the outside. Also, as illustrated in FIGS. 10A and 10B, a front surface (sensing surface) 34f of the sensor 34 is pressed against the windshield surface 11a by the sensor assembling leaf spring 36. Also, a gap 60 is formed between the support stay mounting surface 12a and the mounted surface 14a (more precisely, between the sensor pressing portion 36c of the sensor assembling leaf spring 36 and the support stay mounting portion 18c of the support stay mounting leaf spring 18). Various harnesses such as a sensor harness and a harness for a camera monitoring system (CMS), harness connectors, etc., can be disposed by effectively using the gap 60. Therefore, space for places for dispositions of these harnesses and harness connectors can be saved, enabling reduction of an area in the windshield 11, the area blocking a forward view, and as a result, enabling widening the forward view and thus contribution to safe driving. Also, since the support stay 14 are not in contact with the sensor 34 and the sensor assembling leaf spring 36, vibration of the support stay 14 due to the vehicle running is less easily transmitted to the sensor 34, enabling a failure of the sensor 34 to be less likely to occur.

The abutment support structures 20 formed of the support surface 22 of the support stay mounting surface 12a and the protrusions 21 of the mounted surface 14a will be described. FIG. 11A illustrates a state in which the mounting base 12 is mounted to the windshield surface 11a, when the mounting base 12 is viewed from just in front of the support stay mounting surface 12a (that is, in the axis direction of the rotation axis 19). The alternate long and short dash line indicates the vertical plane 64 extending through the rotation axis 19 in the vehicle front-rear direction (plane orthogonal to the sheet of FIG. 11A). This alternate long and short dash line also indicates a center line 12c of the support stay mounting surface 12a. FIG. 11B illustrates a contour shape (undulation shape) of the support surface 22, which is a mounting base 12-side structure of the abutment support structures 20. This contour shape is one obtained by an entire circumference of the contour shape extending in the direction around the rotation axis 19 being developed in the direction of arrow R in FIG. 11A. Parts in FIG. 11B corresponding to parts indicated by arrow P1 to P5 in FIG. 11A are indicated by reference numerals that are the same as those in FIG. 11A, respectively. These parts P1 to P5 form respective abutment support portions that when the support stay 14 is mounted, come into pressure abutment with the protrusions 21 of the support stay 14 and thereby support the support stay 14. The support surface 22 includes five troughs 24 (24-1 to 24-5) and five crests 23 (23-1 to 23-5) alternately. Inclined surfaces 25 (25-1 to 25-5) are disposed at respective boundaries between the troughs 24 and the crests 23. In mounting the support stay 14 on the mounting base 12, the protrusions 21 slides from the troughs 24 to crests 23 through the inclined surfaces 25, respectively, against the biasing force of the legs 18a. The total four entrances 32 are disposed at respective circumferential positions at which the four troughs 24-2 to 24-5 are disposed. A fitting groove 23a (dent of a fitting structure) having a V-shape in section is formed at an intermediate position in the circumferential direction of each of the five crests 23. The fitting lugs 21a (bumps of the fitting structures) formed at the mound-like tops of the protrusions 21 of the support stay 14 are fitted in the respective fitting grooves 23a. The fitting grooves 23a and the fitting lugs 21a are fitted together and the fitting grooves 23a and the fitting lugs 21a are brought into pressure abutment with each other by the biasing force of the legs 18a, forming the abutment support portion P1 to P5, respectively. The five fitting grooves 23a are formed so as to extend in the radial direction with the rotation axis 19 as a center. Here, the fitting groove 23a of the abutment support portion P1 (first abutment support portion) from among the five fitting grooves 23a is disposed on the vertical plane 64. In other words, the fitting groove 23a of the abutment support portion P1 is formed so as to extend in an angle direction toward the lower side of a circumference around the rotation axis 19 (here, a direction directly toward the lower side of the circumference around the rotation axis 19) from among radial directions with the rotation axis 19 as a center. Here, the angle direction toward the lower side of the circumference around the rotation axis 19 refers to an angle direction toward the lower side from the rotation axis 19 in FIG. 11A. In other words, the angle direction refers to an angle direction toward the lower side from the rotation axis 19 when the mounting base 12 is viewed in the axis direction of the rotation axis 19 in a position in which the mounting base 12 is mounted to the windshield surface 11a. A load of the inner mirror 10 is imposed in the angle direction toward the lower side of the circumference around the rotation axis 19, and thus, the load of the inner mirror 10 can efficiently be supported by the first abutment support portion P1 by disposing the fitting groove 23a of the first abutment support portion P1 in the angle direction. Also, a direction in which the fitting groove 23a of the first abutment support portion P1 extends corresponds to a direction of sliding drop-off of the support stay 14, and when the support stay 14 slides and drops off, the fitting lug 21a of the protrusion 21 of the abutment support portion P1 slides downward in the fitting groove 23a, enabling the fitting with the fitting groove 23a to be undone easily. In other words, when the support stay 14 slides and drops off, the fitting lug 21a does not need to climb over the fitting groove 23a in a width direction of the fitting groove 23a. Therefore, the fitting groove 23a does not interrupt sliding drop-off of the support stay 14. The fitting grooves 23a of remaining four abutment support portions P2, P3, P4, P5 (second abutment support portions), from among the five fitting grooves 23a, are formed so as to extend in respective angle directions toward the upper right side, the lower right side, the lower left side and the upper left side of the circumference around the rotation axis 19 from among the radial directions with the rotation axis 19 as a center (respective angle directions toward the upper right side, the lower right side, the lower left side and the upper left side from the rotation axis 19 in FIG. 11A). The fitting lugs 21a that are fitted in the five fitting grooves 23a, respectively, are formed as mound-like ridges (fitting ridges) extending in respective radial directions with the rotation axis 19 as a center so as to fit in the fitting grooves 23a (see FIG. 5A). Consequently, the support stay 14 can stably be supported at five points on all of the sides of the circumference around the rotation axis 19 with the rotation axis 19 as a center. Also, at the total five abutment support portions P1 to P5, the fitting lug 21a of the support stay 14 are fitted in and thereby supported by the respective fitting grooves 23a, enabling stably maintaining the state in which the support stay 14 is mounted to the mounting base 12.

The total five troughs 24 are located on a same plane orthogonal to the rotation axis 19 and forms a reference plane of the support stay mounting surface 12a. A height of the crests 23 relative to the reference plane is set as follows. In other words, all of areas except areas 23-3 (L), 23-4 (L) (that is, areas 23-1, 23-2, 23-3 (H), 23-4 (H), 23-5) have a same height. The areas 23-3 (L), 23-4 (L) are lower by a certain amount than the areas 23-1, 23-2, 23-3 (H), 23-4 (H), 23-5. The area 23-3 (L) is an area located on the front side in the sliding drop-off direction and defined with the relevant fitting groove 23a as a boundary, in the entire circumferential area of the crest 23-3. The area 23-4 (L) is an area located on the front side in the sliding drop-off direction and defined with the relevant fitting groove 23a as a boundary, in the entire circumferential area of the crest 23-4. In other words, in the crest 23-3 of the abutment support portion P3, the area 23-3 (L) on the front side in the sliding drop-off direction is lower in height from the reference plane than of the area 23-3 (H) on the rear side in the sliding drop-off direction with the fitting groove 23a therebetween. Likewise, in the crest 23-4 of the abutment support portion P4, the area 23-4 (L) on the front side in the sliding drop-off direction is lower than in height from the reference plane than the area 23-4 (H) on the rear side in the sliding drop-off direction with the fitting groove 23a therebetween. Consequently, in each of the abutment support portions P3, P4, the fitting between the fitting lug 21a and the fitting groove 23a easily undoes in the sliding drop-off direction, facilitating sliding drop-off.

Figure 12A:
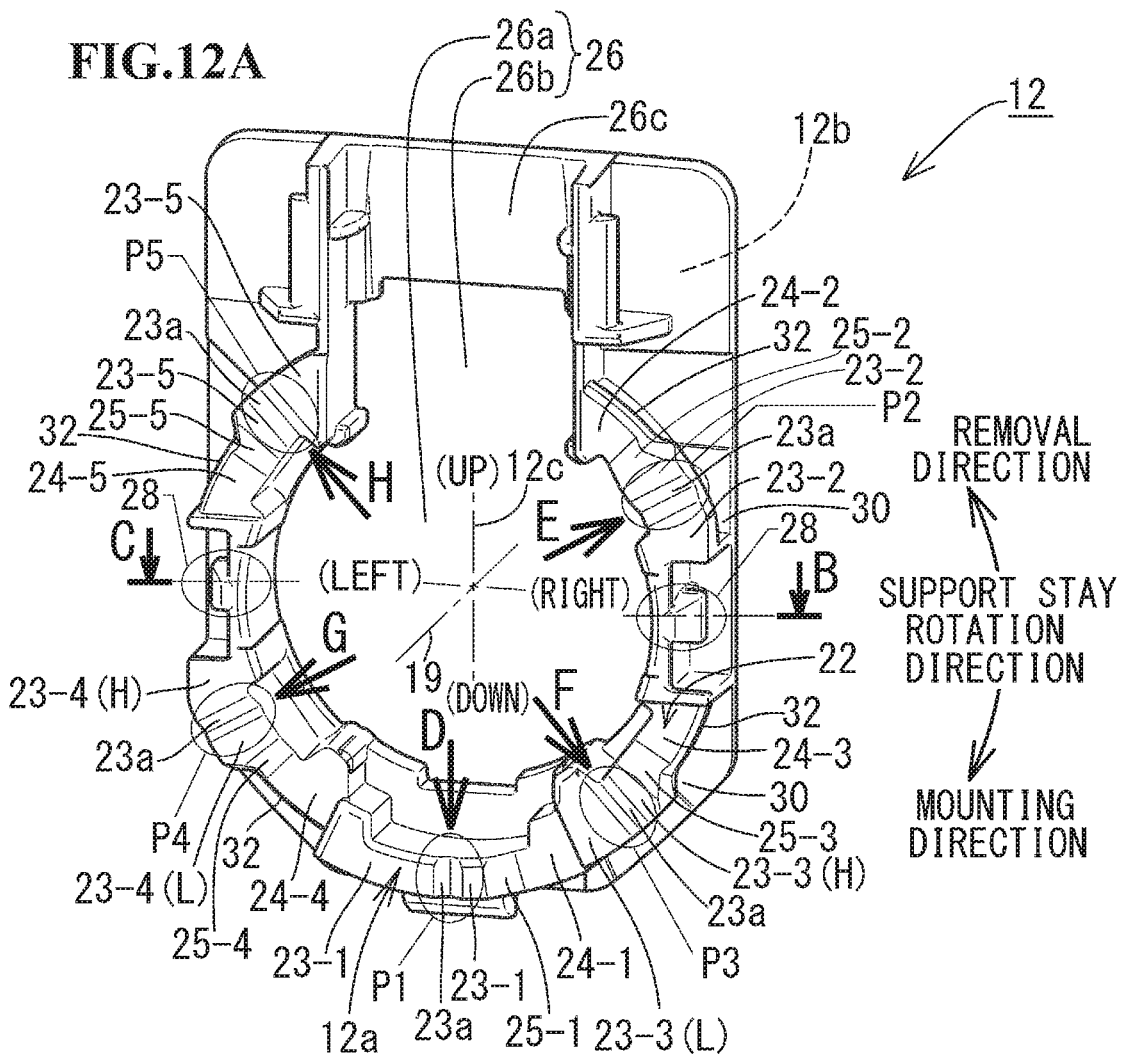
FIG. 12A is a diagram of the mounting base in FIG. 1 as viewed from a position slightly obliquely above the front of the support stay mounting surface.

Assembled structures in respective parts in a state in which the sensor 34 and the support stay 14 are assembled to the mounting base 12 will be described with reference to FIGS. 12A to 12H. FIG. 12A is a diagram of the mounting base 12 as viewed from a position slightly obliquely in front of the support stay mounting surface 12a. In FIG. 12A, respective directions from which the structures in the respective parts illustrated in FIGS. 12B to 12H are viewed are indicated by arrows B to H, respectively. FIGS. 12B to 12H illustrate sectional structures or structures in arrows B to H directions in FIG. 12A, respectively, in a state in which the sensor 34 and the support stay 14 are assembled to the mounting base 12. Each structure will be described. Note that as can be understood from FIG. 11B, etc., FIGS. 12D to 12H are drawn upside down.

<<Arrow B Sectional Structure (FIG. 12B)>>

Figure 12B:
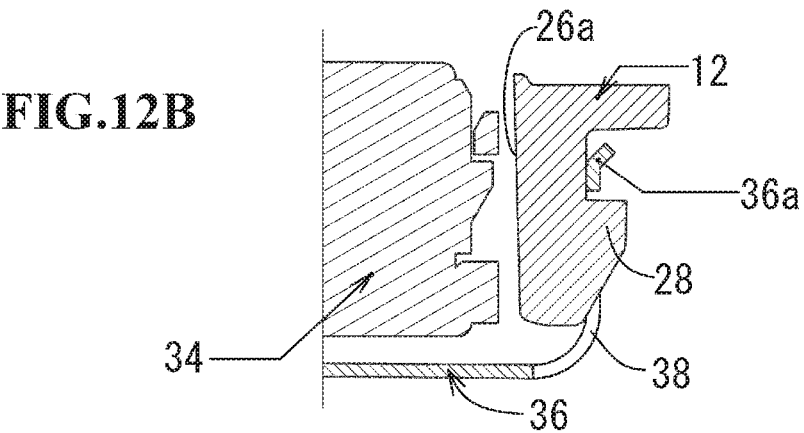
FIG. 12B is a sectional view at the position indicated by arrow B in FIG. 12A in a state in which the sensor is mounted to the mounting base via the sensor assembling leaf spring.

FIG. 12B illustrates a sectional structure at the position indicated by arrow B in FIG. 12A, that is, a structure in which the mounting base mounting leg 36a on the right side of the sensor assembling leaf spring 36 is mounted to the mounting base-side leaf spring mounting portion 28 on the right side of the mounting base 12. The mounting base mounting leg 36a is mounted to the mounting base-side leaf spring mounting portion 28 by bringing the relevant mounting base mounted portion 38 (pawl engagement hole) into pawl engagement with the mounting base-side leaf spring mounting portion 28 (engagement pawl).

<<Arrow C Sectional Structure (FIG. 12C)>>

Figure 12C:
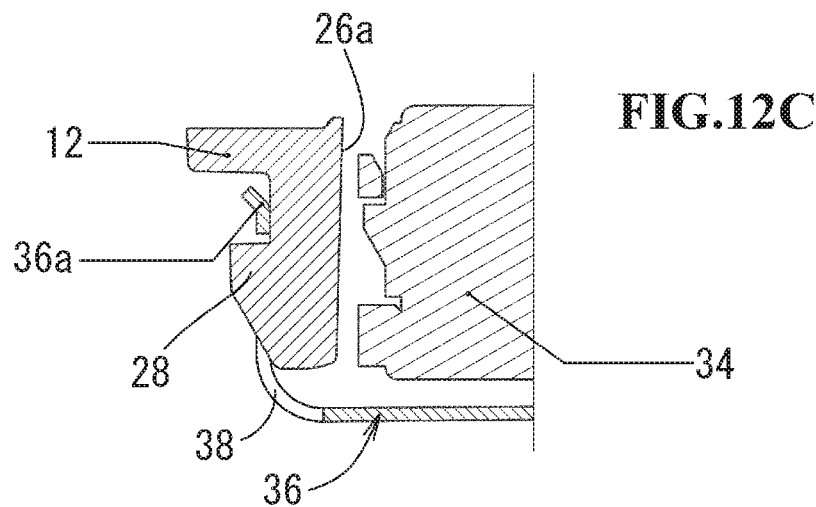
FIG. 12C is a sectional view at the position indicated by arrow C in FIG. 12A in a state in which the sensor is mounted to the mounting base via the sensor assembling leaf spring.

FIG. 12C illustrates a sectional structure at the position indicated by arrow C in FIG. 12A, that is, a structure in which the mounting base mounting leg 36a on the left side of the sensor assembling leaf spring 36 is mounted to the mounting base-side leaf spring mounting portion 28 on the left side of the mounting base 12. The mounting base mounting leg 36a is mounted to the mounting base-side leaf spring mounting portion 28 by bringing the relevant mounting base mounted portion 38 (pawl engagement hole) into pawl engagement with the mounting base-side leaf spring mounting portion 28 (engagement pawl).

<<Arrow D Structure (FIG. 12D)>>

Figure 12D:
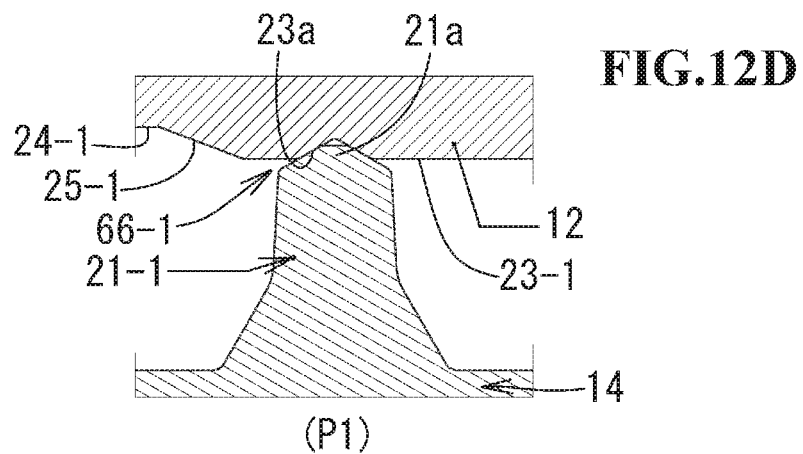
FIG. 12D is a sectional view at the position indicated by arrow D in FIG. 12A in a state in which the support stay is mounted to the mounting base.

FIG. 12D illustrates a structure at the position indicated by arrow D in FIG. 12A, that is, a structure that supports the first abutment support portion P1. A fitting structure 66-1 is formed by the relevant fitting lug 21a being fitted in the relevant fitting groove 23a.

<<Arrow E Structure (FIG. 12E)>>

Figure 12E:
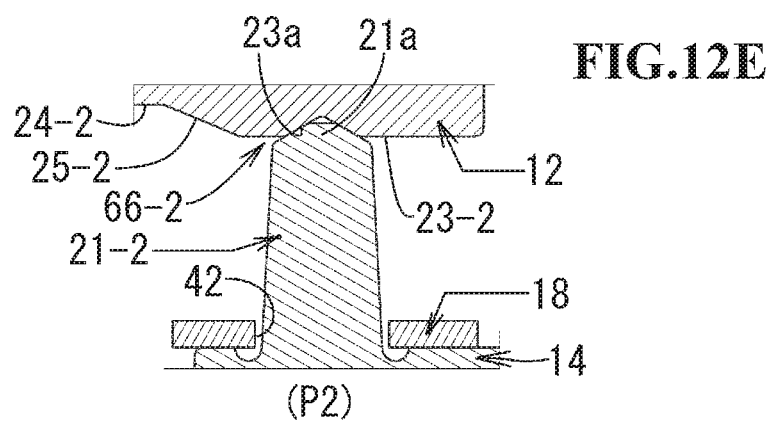
FIG. 12E is a sectional view at the position indicated by arrow E in FIG. 12A in a state in which the support stay is mounted to the mounting base.

FIG. 12E illustrates a structure at the position indicated by arrow E in FIG. 12A, that is, a structure that supports the second abutment support portion P2. A fitting structure 66-2 is formed by the relevant fitting lug 21a being fitted in the relevant fitting groove 23a.

<<Arrow F Structure (FIG. 12F)>>

Figure 12F:
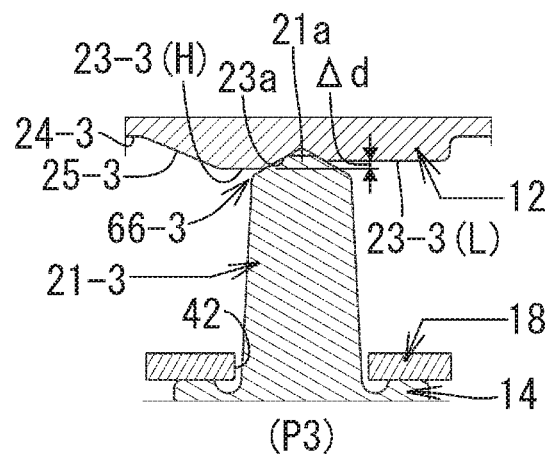
FIG. 12F is a sectional view at the position indicated by arrow F in FIG. 12A in a state in which the support stay is mounted to the mounting base.

FIG. 12F illustrates a structure at the position indicated by arrow F in FIG. 12A, that is, a structure that supports the second abutment support portion P3. A fitting structure 66-3 is formed by the relevant fitting lug 21a being fitted in the relevant fitting groove 23a. As described above, in the crest 23-3 of the support surface 22, the area 23-3 (L) on the front side in the sliding drop-off direction is lower by an amount indicated by a level difference d than the area 23-3 (H) on the rear side in the sliding drop-off direction in height from the reference plane (trough 24), the fitting groove 23a being interposed between the front side and the rear side. Consequently, sliding drop-off is facilitated.

<<Arrow G Structure (FIG. 12G)>>

Figure 12G:
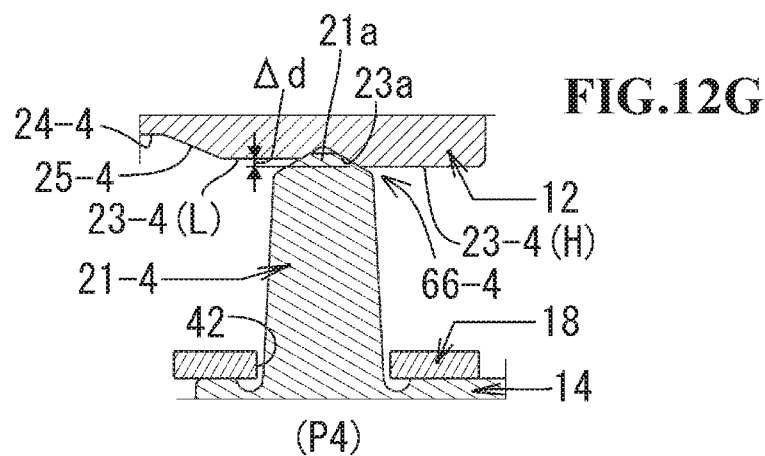
FIG. 12G is a sectional view at the position indicated by arrow G in FIG. 12A in a state in which the support stay is mounted to the mounting base.

FIG. 12G illustrates a structure at the position indicated by arrow G in FIG. 12A, that is, a structure that supports the second abutment support portion P4. A fitting structure 66-4 is formed by the relevant fitting lug 21a being fitted in the fitting groove 23a. As described above, in the crest 23-4 of the support surface 22, the area 23-4(L) on the front side in the sliding drop-off direction is lower by an amount indicated by a level difference $\nabla A$ than the area 23-4(H) on the rear side in the sliding drop-off direction in height from the reference plane (trough 24), the fitting groove 23a being interposed between the front side and the rear side. Consequently, sliding drop-off is facilitated.

<<Arrow H Structure (FIG. 12H)>>

Figure 12H:
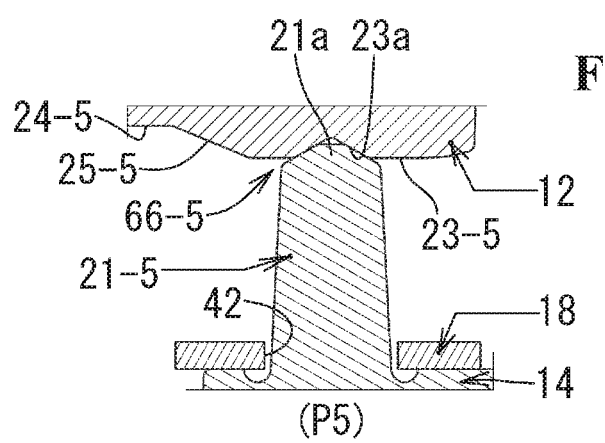
FIG. 12H is a sectional view at the position indicated by arrow H in FIG. 12A in a state in which the support stay is mounted to the mounting base.

FIG. 12H illustrates a structure at the position indicated by arrow H in FIG. 12A, that is, a structure that supports the second abutment support portion P5. A fitting structure 66-5 is formed by the relevant fitting lug 21a being fitted in the relevant fitting groove 23a.

The fitting structures 66-1 to 66-5 of the five abutment support portions P1 to P5 around the rotation axis 19 described above enable stably holding a state in which the support stay 14 is mounted to the mounting base 12.

Actions in respective steps in mounting the support stay 14 on the mounting base 12 will be described in order with reference to FIGS. 13 to 16. Note that in FIGS. 13 to 16, Figures A to D illustrate the following.

Figure A: relationship in position in the direction around the rotation axis 19 between the mounting base 12 and the support stay 14

Figure B: radial section at a position of a protrusion 21-2, 21-3, 21-4, 21-5

Figure C: circumferential section of a part around the protrusion 21-2, 21-3, 21-4, 21-5. However, the illustration is provided with the level differences Δd of the crests 23-3, 23-4 illustrated in FIGS. 12F and 12G ignored.

Figure D: circumferential section of a part around the protrusion 21-1 Each of the steps will be described below.

<<First Step (FIG. 13): Pressing of the Support Stay into the Mounting Base>>

Figure 13A:
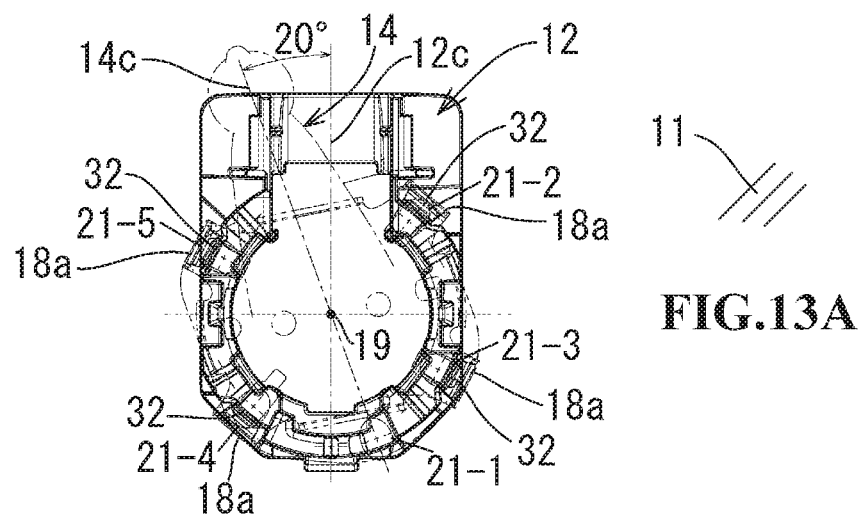
FIG. 13A is a diagram of the first step as viewed from just in front of the support stay mounting surface.
Figure 13B:
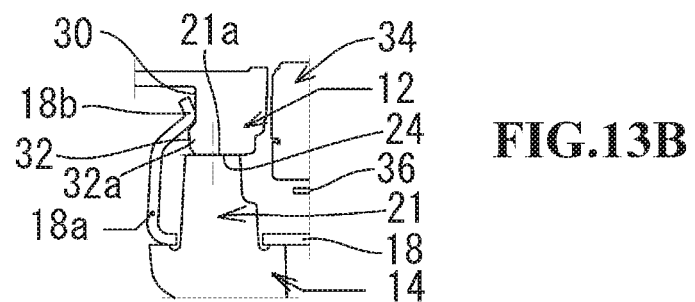
FIG. 13B illustrates a radial section at a position of a protrusion 21-2, 21-3, 21-4, 21-5 in the first step in FIG. 13A.
Figure 13C:
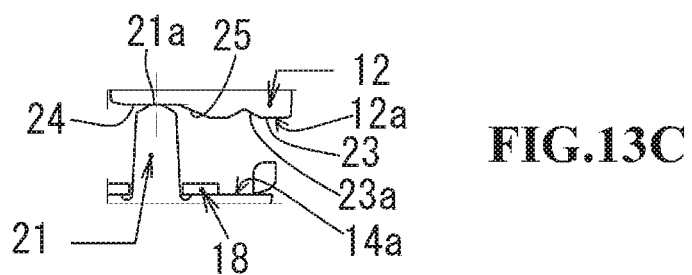
FIG. 13C illustrates a circumferential section of a part around the protrusion 21-2, 21-3, 21-4, 21-5 in the first step in FIG. 13A.
Figure 13D:
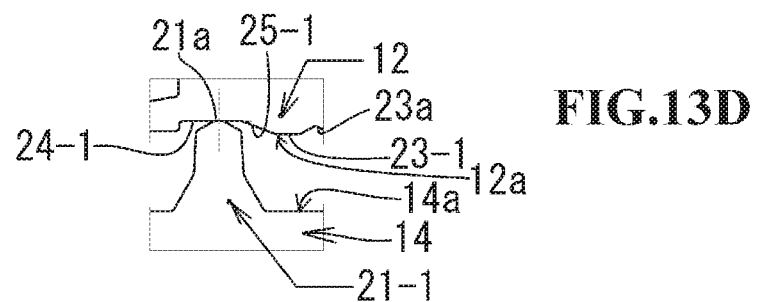
FIG. 13D illustrates a circumferential section of a part around a protrusion 21-1 in the first step in FIG. 13A.

As illustrated in FIG. 13A, the four legs 18a are adjusted to the respective positions of the entrances 32. At this time, an angle, in the direction around the rotation axis 19, of a center line 14c of the mounted surface 14a relative to a center line 12c of the support stay mounting surface 12a is 20 degrees. In this state, the support stay 14 is pressed into the mounting base 12 in the direction along the rotation axis 19. Consequently, the pawls 18b enter the entrances 32. As illustrated in FIG. 13B, each entrance 32 includes a gentle ridge 32a (ridge in a direction orthogonal to the entering direction). The pawl 18b that has entered the entrance 32 climbs over the ridge 32a with relatively small strength against the biasing force of the leg 18a and engages with the circumferential groove 30. Once the pawl 18b engages with the circumferential groove 30, the pawl 18b is locked by the ridge 32a so as to be prevented from movement in a direction in which the pawl 18b comes out of the entrance 32, and thus, the support stay 14 is joined to the mounting base 12 to the extent that the support stay 14 does not drop off under its own weight. Upon the pawl 18b engaging with the circumferential groove 30, the pawl 18b is locked by a wall surface on the one end side, in a direction in which the circumferential groove 30 extends, of the circumferential groove 30 so as to be prevented from rotating in the counterclockwise direction, and is capable of rotating in the clockwise direction only. Upon the pawl 18b engaging with the circumferential groove 30, as illustrated in FIGS. 13B to 13D, the fitting lug 21a abuts against the trough 24.

<<Second Step (FIG. 14): Rotation of the Support Stay (Part 1: Moving the Troughs)>>

Figure 14A:
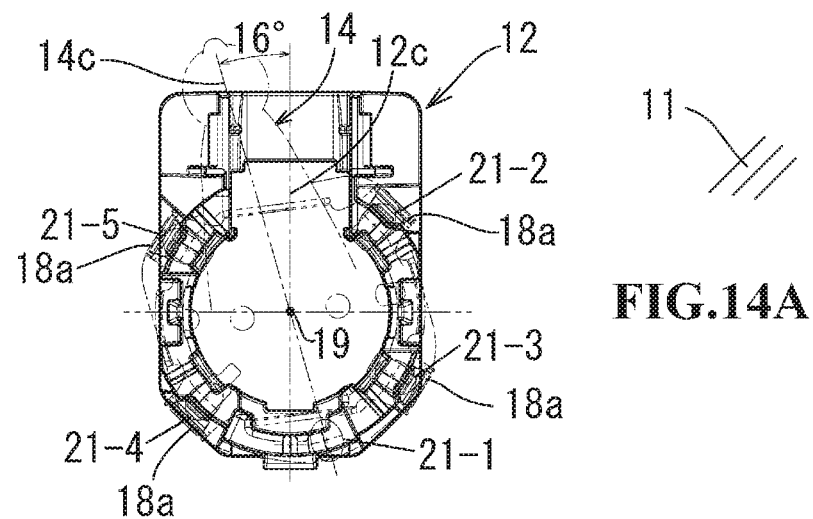
FIG. 14A illustrates a second step in which following the first step, the support stay is rotated in a rotary mounting direction (clockwise direction) and each protrusion reaches a position at which the protrusion starts climbing an inclined surface of the support surface.
Figure 14B:
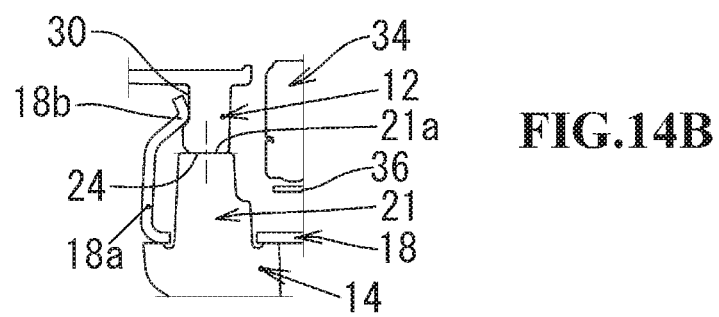
FIG. 14B is a radial section at the position of the protrusion 21-2, 21-3, 21-4, 21-5 in the second step in FIG. 14A.
Figure 14C:
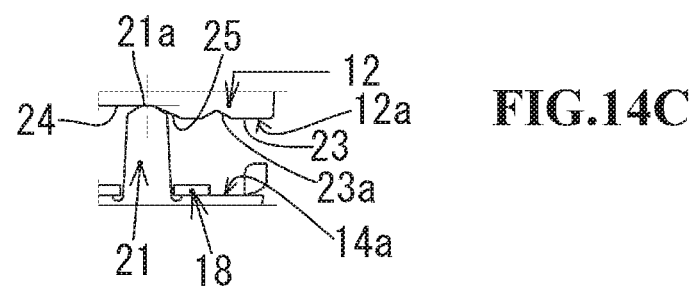
FIG. 14C is a circumferential section of the part around the protrusion 21-2, 21-3, 21-4, 21-5 in the second step in FIG. 14A.
Figure 14D:
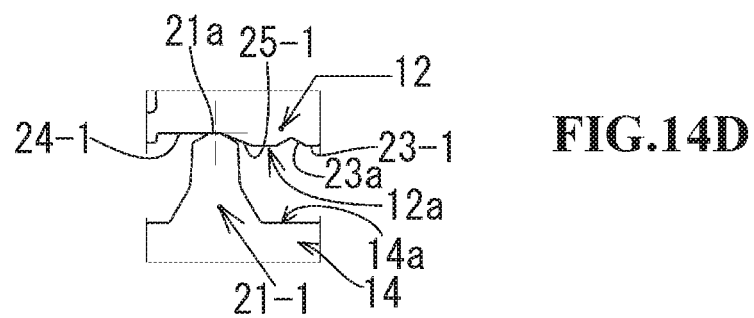
FIG. 14D is a circumferential section of the part around the protrusion 21-1 in the second step in FIG. 14A.

Following the first step, as illustrated in FIG. 14A, the support stay 14 is rotated in the clockwise direction. Consequently, the fitting lug 21a slides and moves in the trough 24, and as illustrated in FIGS. 14C and 14D, the fitting lug 21a reaches a boundary between the trough 24 and the inclined surface 25. At this time, the angle, in the direction around the rotation axis 19, of the center line 14c of the mounted surface 14a relative to the center line 12c of the support stay mounting surface 12a is 16 degrees. Up to this point, the biasing force of the leg 18a does not act and the support stay 14 can be rotated easily.

<<Third Step (FIG. 15): Rotation of the Support Stay (Part 2: Climbing the Inclined Surface)>>

Figure 15A:
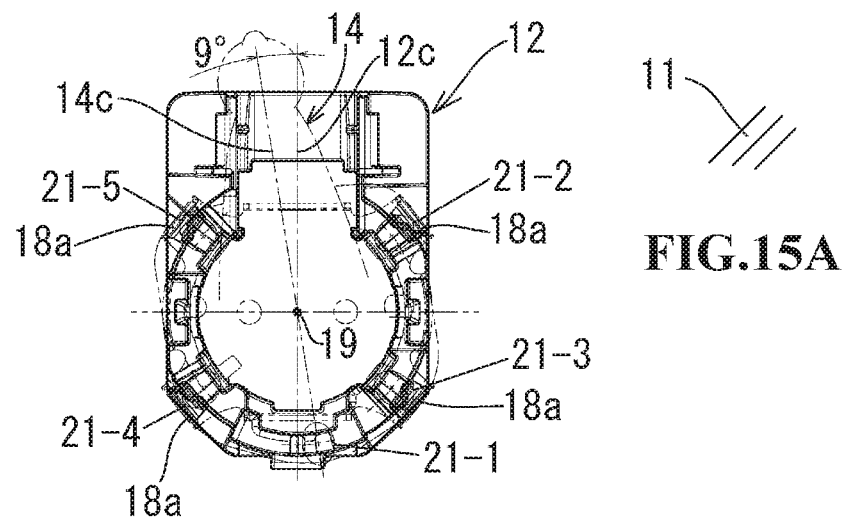
FIG. 15A illustrates a third step in which following the second step, the support stay is further rotated in the rotary mounting direction and each protrusion reaches a position at which the protrusion finishes climbing the inclined surface of the support surface.
Figure 15B:
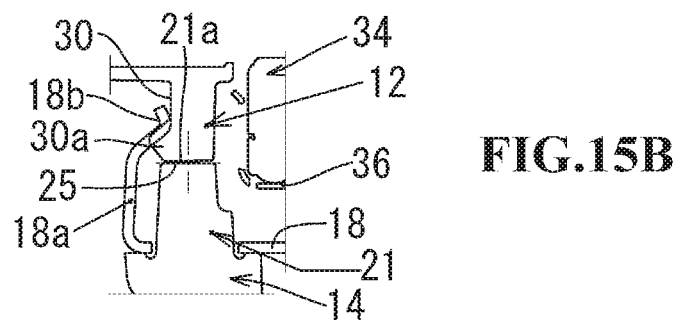
FIG. 15B is a radial section at the position of the protrusion 21-2, 21-3, 21-4, 21-5 in the third step in FIG. 15A.
Figure 15C:
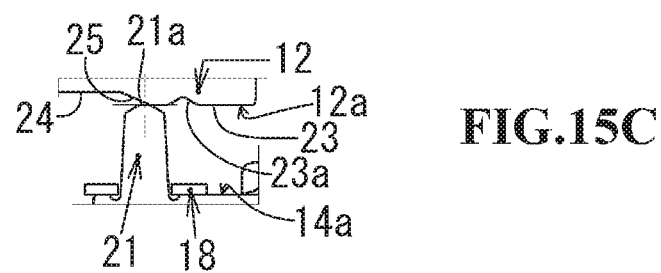
FIG. 15C is a circumferential section of the part around the protrusion 21-2, 21-3, 21-4, 21-5 in the third step in FIG. 15A.
Figure 15D:
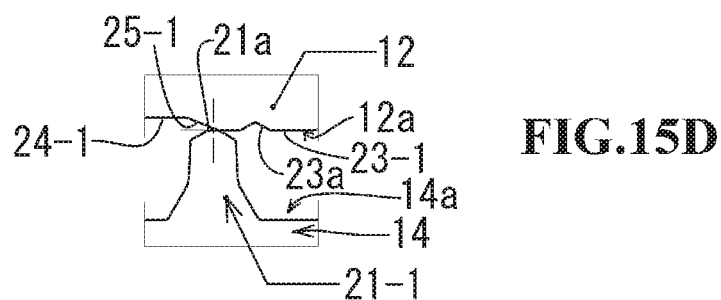
FIG. 15D illustrates a circumferential section of the part around the protrusion 21-1 in the third step in FIG. 15A.

Following the second step, as illustrated in FIG. 15A, the support stay 14 is further rotated in the clockwise direction. Consequently, the fitting lug 21a slides on and climbs the inclined surface 25. As the fitting lug 21a climbs the inclined surface 25, a distance between the support stay mounting surface 12a and the mounted surface 14a is widened, causing an increase in biasing force of the leg 18a. At this time, the pawl 18b is locked by the side wall 30a of the circumferential groove 30, the side wall 30a being in a width direction of the circumferential groove 30, and thus, even if the biasing force of the leg 18a increases, the pawl 18b is prevented from disengaging from the circumferential groove 30. As illustrated in FIGS. 15C and 15D, the fitting lug 21a climbs up the inclined surface 25 and reaches the crest 23. At this time, the angle, in the direction around the rotation axis 19, of the center line 14c of the mounted surface 14a relative to the center line 12c of the support stay mounting surface 12a is 9 degrees.

<<Fourth Step (FIG. 16): Completion of Mounting of the Support Stay>>

Figure 16A:
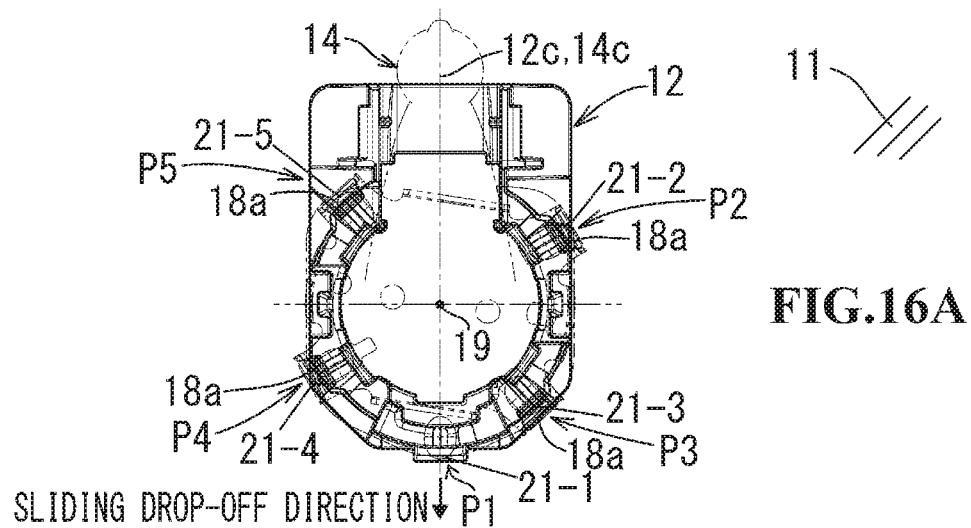
FIG. 16A illustrates a fourth step in which following the third step, mounting of the support stay to the mounting base is completed by further rotating the support stay in the rotary mounting direction, providing a fit in a fitting structure of each abutment support portion.
Figure 16B:
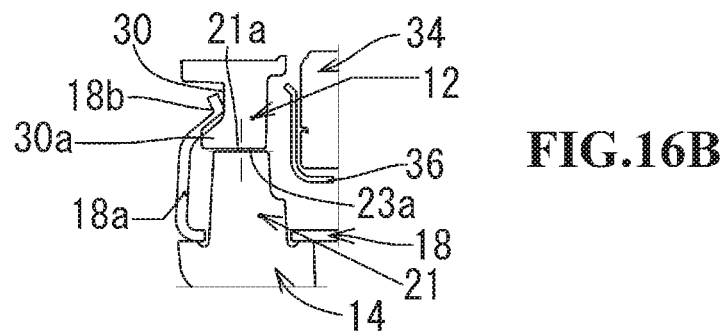
FIG. 16B is a radial section at the position of the protrusion 21-2, 21-3, 21-4, 21-5 in the fourth step in FIG. 16A.
Figure 16C:
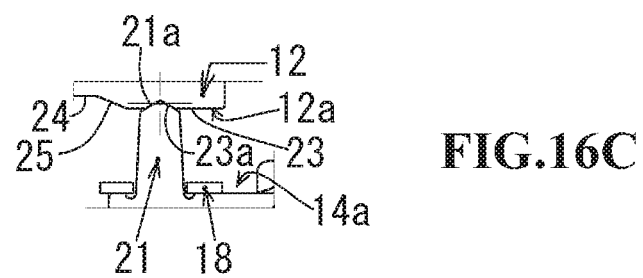
FIG. 16C illustrates a circumferential section of the part around the protrusion 21-2, 21-3, 21-4, 21-5 in the fourth step in FIG. 16A (that is, a part around the second abutment support portion P2, P3, P4, P5).
Figure 16D:
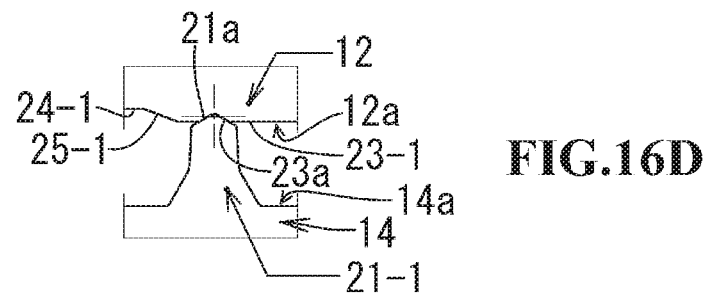
FIG. 16D illustrates a circumferential section of the part around the protrusion 21-1 in the fourth step in FIG. 16A (that is, a part around the first abutment support portion P1).

Upon the support stay 14 being continuously rotated in the clockwise direction after the fitting lug 21a reaching the crest 23, as illustrated in FIGS. 16C and 16D, the fitting lug 21a slides a little on the crest 23 and fits in the fitting groove 23a. At this time, as illustrated in FIG. 16A, the angle, in the direction around the rotation axis 19, of the center line 14c of the mounted surface 14a relative to the center line 12c of the support stay mounting surface 12a is 0 degrees. Consequently, the mounting of the support stay 14 on the mounting base 12 is completed. Note that even if an attempt is made to further rotate the support stay 14 in the clockwise direction in a state in which the fitting lug 21a fits in the fitting groove 23a, the pawl 18b is locked by a wall surface on the other end side, in the direction in which the circumferential groove 30 extends, of the circumferential groove 30 and thus the support stay 14 hardly rotates. Therefore, the fitting lug 21a once fitting in the fitting groove 23a is prevented from passing through the fitting groove 23a without stopping, and even if the fitting lug 21a once fitting in the fitting groove 23a passes through the fitting groove 23a, it is possible to make the fitting lug 21a return right away and fit in the fitting groove 23a again. Also, if there is a need to remove the once mounted support stay 14 for, e.g., mirror replacement, the support stay 14 is rotated in the counterclockwise direction with large strength against the biasing force of the leg 18a. Consequently, the fitting between the fitting lug 21a and the fitting groove 23a undoes, enabling the support stay 14 to be removed from the mounting base 12 according to steps the reverse of those for mounting.

An action of the support stay 14 mounted to the mounting base 12 dropping off from the mounting base 12 upon reception of a large external force will be described.

<<Rotational Drop-Off Action>>

In FIG. 16A, upon a large external force toward the vehicle front side in a horizontal direction being applied to the support stay 14, the support stay 14 rotates, for example, with the abutment support portion P1 on the lower side as a point of support, in such a manner that a part, on the side opposite to the point of support, of the support stay 14 is removed from the mounting base 12. In other words, on the abutment support portion P2, P5 side, which is the upper side, engagement between the pawl 18b and the circumferential groove 30 is undone by the pawl 18b climbing over the side wall 30a (FIG. 16B) in the width direction of the circumferential groove 30 against the biasing force of the legs 18a. Consequently, the support stay 14 rotates so as to be removed from the mounting base 12 (that is, moved away from the windshield surface 11a), and thereby dropping off from the mounting base 12.

<<Sliding Drop-Off Action>>

In FIG. 16A, for example, upon an external force toward the obliquely lower side of the vehicle front side along the windshield surface 11a being applied to the support stay 14, the engagement between the pawls 18b and the circumferential grooves 30 is undone in that direction against the biasing force of the legs 18a. Consequently, the support stay 14 slides obliquely downward along the mounting base 12 and drops off from the mounting base 12. At this time, in each of the abutment support portions P2, P3, P4, P5, the fitting lug 21a climbs over the fitting groove 23a and the fitting between the fitting groove 23a and the fitting lug 21a is thereby undone. Among these, in each of the abutment support portions P3, P4, the area 23-3 (L), 23-4 (L) of the crest, the area 23-3 (L), 23-4 (L) being adjacent to the sliding drop-off direction side of the fitting groove 23a, is lowered because of the above-described level difference Δd (FIGS. 12F and 12G), and thus, the fitting can easily be undone in the sliding drop-off direction. Also, since in the abutment support portion P1, the fitting groove 23a extends in the sliding drop-off direction, the fitting between the fitting lug 21a and the fitting groove 23a can easily be undone by the fitting groove 23a sliding in the fitting groove 23a (that is, without climbing over the fitting groove 23a).

Although in the above embodiment, the first abutment support portion is disposed just on the center line of the support stay mounting surface (that is, in the angle direction just toward the lower side of the circumference around the rotation axis with the rotation axis as a center), the present invention is not limited to this example. In other words, the first abutment support portion can be disposed at a position a little off from the center line of the support stay mounting surface (angle direction generally toward the lower side of the circumference around the rotation axis with the rotation axis as a center). Also, the first abutment support portion can be separated into left and right parts and the left and right parts can be disposed in the vicinity of the center line of the support stay mounting surface, with the center line therebetween. In other words, in this invention, the "lower side" does not need to be the strict lower side. Although in the above embodiment, a second abutment support portion is disposed at each of four places, a second abutment support portion can be disposed in each of five or more places. Although in the above embodiment, the crests and the troughs of the abutment support structures are disposed on the mounting base side, and the protrusions are disposed on the support stay side, the disposition can be reversed. In other words, the protrusions of the abutment support structures can be disposed on the mounting base side and the crests and the troughs can be disposed on the support stay side. Although in the above embodiment, a fitting structure including a fitting groove forming a dent, the fitting groove extending downward along a support stay mounting surface of a mounting base, and a fitting lug forming a bump, the fitting lug fitting in the fitting groove, in a position in which the mounting base is fixed to a windshield surface of a cabin of a vehicle and a support stay is mounted to the mounting base is disposed in the first abutment support portion, the position at which the fitting structure is disposed is not limited to this example. In other words, the fitting structure can be disposed in another abutment support portion at each of one or more places in place of the first abutment support portion or in addition to the first abutment support portion. Although in the above embodiment, the support stay mounting leaf spring is mounted to the support stay by means of screw fastening, the method for mounting the support stay mounting leaf spring to the support stay is not limited to this example. For example, a support stay mounting leaf spring can be mounted to a support stay by means of insert molding by disposing the support stay mounting leaf spring in a mold for resin-molding of the support stay. Although the above embodiment has been described in terms of a case where this invention is applied to an inner mirror with a sensor incorporated in a mounting base, this invention is applicable also to an inner mirror with no sensor incorporated in a mounting base. Although the above embodiment has been described in terms of a case where this invention is applied to an inner mirror including an opening (sensor assembling void 26) in a mounting base, this invention is applicable also to an inner mirror including no opening in a mounting base. Although the inner mirror of the above embodiment includes a support stay and a mirror body that are separated from each other, this invention is applicable also to an inner mirror including a support stay and a mirror body that are not separated from each other (that is, a structure in which a support stay and a mirror body are integrated). The above embodiment has been described in terms of a case where this invention is applied to a mounting structure for an inner mirror (in-vehicle viewing device), this invention is applicable also to a mounting structure for another in-vehicle device such as an in-vehicle camera.

The invention claimed is:

1. A support stay mounting structure for an in-vehicle device, the support stay mounting structure comprising:
   a mounting base to be mounted to a windshield surface of a cabin of a vehicle; and
   a support stay to be mounted to the mounting base so as to be capable of dropping off from the mounting base, wherein:
   the mounting base has a support stay mounting surface and the support stay has a mounted surface that are made to face each other and the mounting base and the support stay are joined via a support stay mounting leaf spring so as to be capable of rotating relative to each other in a direction around a predetermined rotation axis crossing the support stay mounting surface and the mounted surface;
   the support stay mounting surface and the mounted surface include respective abutment support structures that are formed in the direction around the rotation axis and abut against each other via a biasing force of the support stay mounting leaf spring;
   the support stay mounting structure is configured in such a manner that the support stay is capable of rotating in the direction around the rotation axis against the biasing force of the support stay mounting leaf spring in a state in which the mounting base and the support stay are joined via the support stay mounting leaf spring such that the support stay is mounted to the mounting base by increasing the biasing force of the support stay mounting leaf spring via the abutment support structures to bring the support stay mounting surface and the mounted surface into pressure-abutment with each other;
   the support stay mounting structure is configured in such a manner that an external force of a predetermined amount or more applied to the support stay in a state in which the support stay is mounted to the mounting base causes joining between the support stay and the mounting base to be undone against the biasing force of the support stay mounting leaf spring by the external force to make the support stay drop off from the mounting base;

the abutment support structures include a structure in which the support stay mounting surface and the mounted surface are made to abut against each other via a plurality of abutment support portions surrounding the rotation axis; and the plurality of abutment support portions includes a first abutment support portion disposed in an angle direction generally directly towards a lower side of a circumference around the rotation axis with the rotation axis as a center in a position in which the mounting base is fixed to a windshield surface of a cabin of a vehicle and the support stay is mounted to the mounting base, wherein a vertical plane bisects the support stay mounting surface in an up-down direction, and the lower side of the circumference is generally aligned with the vertical plane.

2. The support stay mounting structure for the in-vehicle device according to claim 1, wherein in a part or all of the plurality of abutment support portions, the support stay mounting surface and the mounted surface include a fitting structure including a dent and a bump that fit together in a state in which the support stay is mounted to the mounting base.

3. The support stay mounting structure for the in-vehicle device according to claim 2, wherein:

the first abutment support portion includes the fitting structure; and the fitting structure of the first abutment support portion includes a fitting groove that forms the dent, the fitting groove extending in the angle direction toward the lower side of the circumference around the rotation axis from among radial directions with the rotation axis as a center, and a fitting lug forming the bump, the fitting lug fitting in the fitting groove, in a position in which the mounting base is fixed to a windshield surface of a cabin of a vehicle and the support stay is mounted to the mounting base.

4. The support stay mounting structure for the in-vehicle device according to claim 1, wherein the plurality of abutment support portions include at least four second abutment support portions disposed in respective angle directions toward an upper left side, an upper right side, a lower left side and a lower right side of the circumference around the rotation axis with the rotation axis as a center in a position in which the mounting base is fixed to a windshield surface of a cabin of a vehicle and the support stay is mounted to the mounting base, in addition to the first abutment support portion.

5. The support stay mounting structure for the in-vehicle device according to claim 4, wherein:

in each of the second abutment support portions, the support stay mounting surface and the mounted surface include a fitting structure including a dent and a bump that fit together in a state in which the support stay is mounted to the mounting base; and the fitting structure includes a fitting groove forming the dent, the fitting groove extending in a radial direction with the rotation axis as a center, and a fitting lug forming the bump, the fitting lug fitting in the fitting groove, in a position in which the mounting base is fixed to a windshield surface of a cabin of a vehicle and the support stay is mounted to the mounting base.

6. The support stay mounting structure for the in-vehicle device according to claim 5, wherein a support surface of the abutment support structure in each of the second abutment support portions disposed in the angle directions toward the lower left side and the lower right side of the circumference around the rotation axis with the rotation axis as a center has a level difference between an area on a front end side in a sliding drop-off direction and an area in a rear end side in the sliding drop-off direction, with the fitting groove between the areas, for the fitting structure to easily come off in the sliding drop-off direction.

7. The support stay mounting structure for the in-vehicle device according to claim 1, wherein a gap is formed in an area between the support stay mounting surface and the mounted surface, except places at which the support stay mounting surface and the mounted surface abut against each other via the abutment support structures, in a state in which the support stay is mounted to the mounting base.

8. The support stay mounting structure for the in-vehicle device according to claim 1, wherein the mounting base includes a pawl receiving portion for cover mounting.

9. A support stay mounting structure for an in-vehicle device, the support stay mounting structure comprising:

a mounting base to be mounted to a windshield surface of a cabin of a vehicle and a support stay to be mounted to the mounting base so as to be capable of dropping off from the mounting base, wherein:

the mounting base has a support stay mounting surface and the support stay has a mounted surface that are made to face each other, and the mounting base and the support stay are joined via a support stay mounting leaf spring so as to be capable of rotating relative to each other in a direction around a predetermined rotation axis crossing the support stay mounting surface and the mounted surface;

the support stay mounting surface and the mounted surface include respective abutment support structures that are formed in the direction around the rotation axis and abut against each other via a biasing force of the support stay mounting leaf spring;

the support stay mounting structure is configured in such a manner that the support stay is capable of rotating in the direction around the rotation axis against the biasing force of the support stay mounting leaf spring in a state in which the mounting base and the support stay are joined via the support stay mounting leaf spring such that the support stay is mounted to the mounting base by increasing the biasing force of the support stay mounting leaf spring via the abutment support structures to bring the support stay mounting surface and the mounted surface into pressure-abutment with each other;

the support stay mounting structure is configured in such a manner that an external force of a predetermined amount or more applied to the support stay in a state in which the support stay is mounted to the mounting base causes joining between the support stay and the mounting base to be undone against the biasing force of the support stay mounting leaf spring by the external force to make the support stay drop off from the mounting base;

the abutment support structures include a structure in which the support stay mounting surface and the mounted surface are made to abut against each other via a plurality of abutment support portions surrounding the rotation axis;

in part or all of the plurality of abutment support portions, the support stay mounting surface and the mounted surface have fitting structures each including a dent and a bump that fit together in a state in which the support stay is mounted to the mounting base; and part or all of the fitting structures each include a fitting groove forming the dent, the fitting groove of one of the fitting structures extending generally directly downward along the support stay mounting surface of the mounting base, and a fitting lug forming the bump of the one of the fitting structures, the fitting lug that forms the bump of the one of the fitting structures fitting in the fitting groove of the one of the fitting structures, in a position in which the mounting base is fixed to a windshield surface of a cabin of a vehicle and the support stay is mounted to the mounting base, wherein a vertical plane bisects the support stay mounting surface in an up-down direction, and the fitting groove is generally aligned with the vertical plane.

10. A mounting base that is usable as the mounting base in the support stay mounting structure for the in-vehicle device according to claim 1.

11. A mounting base that is usable as the mounting base in the support stay mounting structure for the in-vehicle device according to claim 9.

\* \* \* \* \*